United States Patent
Higuchi

(10) Patent No.: US 8,342,570 B2
(45) Date of Patent: Jan. 1, 2013

(54) AIR BAG SYSTEM FOR VEHICLE

(75) Inventor: Hitoshi Higuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/091,415

(22) Filed: Apr. 21, 2011

(65) Prior Publication Data
US 2011/0193329 A1 Aug. 11, 2011

Related U.S. Application Data

(62) Division of application No. 12/380,839, filed on Mar. 4, 2009, now abandoned.

(30) Foreign Application Priority Data

Mar. 7, 2008 (JP) .................. 2008-057304
Dec. 29, 2008 (JP) .................. 2008-335606

(51) Int. Cl.
*B60R 21/239* (2006.01)
(52) U.S. Cl. .................. 280/739; 280/731; 280/732
(58) Field of Classification Search .................. 280/739, 280/736, 742, 728.1, 730.2, 732, 731; *B60R 21/239*
See application file for complete search history.

(56) References Cited

U.S. PATENT DOCUMENTS

| | | | |
|---|---|---|---|
| 5,829,779 A | 11/1998 | Nakashima et al. | |
| 7,000,943 B2 | 2/2006 | Hasebe et al. | |
| 7,232,001 B2 | 6/2007 | Hakki et al. | |
| 7,770,921 B2 | 8/2010 | Mueller et al. | |
| 2002/0033592 A1 | 3/2002 | Adkisson et al. | |
| 2009/0200778 A1* | 8/2009 | Ishikawa et al. ............. | 280/739 |

FOREIGN PATENT DOCUMENTS

| | | |
|---|---|---|
| JP | 6-286569 A | 10/1994 |
| JP | 8-268213 A | 10/1996 |
| JP | 2001-354108 A | 12/2001 |
| WO | WO 2007/099912 * | 9/2007 |

* cited by examiner

*Primary Examiner* — Eric Culbreth
*Assistant Examiner* — Keith Frisby
(74) *Attorney, Agent, or Firm* — Carrier Blackman & Associates, P.C.; Joseph P. Carrier; William D. Blackman

(57) ABSTRACT

An air bag system for a vehicle includes an air bag body formed by stitching base fabric material, an inflator that charges the air bag body with gas, and a vent hole that is a through hole provided in the air bag body so as to communicate the inside with the outside of the air bag body. The vent hole of the air bag body is formed to be slit-like and longer in a longitudinal direction thereof. The air bag body includes two base fabric pieces having overlapping side ends that are joined together, a tensile-force applying mechanism that applies tensile-force in the longitudinal direction of the vent hole, including a pair of V-shaped stitched lines bent in a sharply angled V-shape and formed on the side ends of the two base fabric pieces with a predetermined distance therebetween that defines the slit-like vent hole, and portions of the side ends aligned with vent hole along the gas discharge direction form a flow-passage restriction membrane.

15 Claims, 18 Drawing Sheets

AIR BAG BODY BEING STITCHED

AIR BAG BODY TURNED OVER +
INNER PRESSURE APPLIED

AIR BAG BODY BEING STITCHED

AIR BAG BODY TURNED OVER +
INNER PRESSURE APPLIED

FIG.10A  TURNED OVER + NO INNER PRESSURE APPLIED
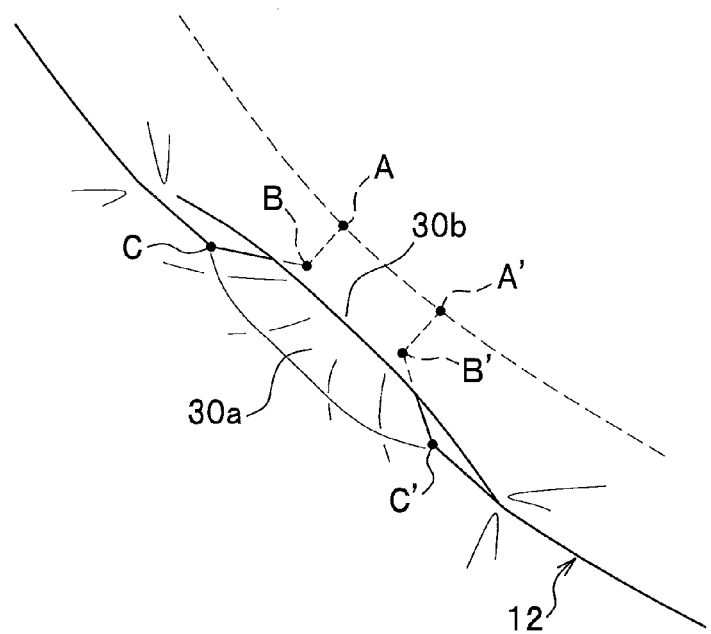
FIG.10B  TURNED OVER + INNER PRESSURE APPLIED
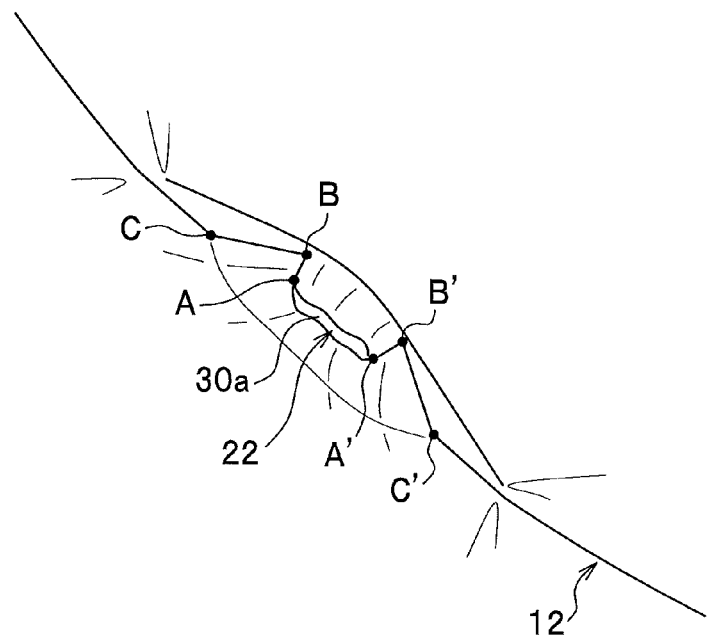

AIR BAG BODY EXPANDED

AIR BAG SYSTEM FOR VEHICLE

CROSS-REFERENCE TO RELATED APPLICATIONS

This application is a divisional of application Ser. No. 12/380,839, filed Mar. 4, 2009, which claims the foreign priority benefit under 35 U.S.C. §119 of Japanese Patent Applications No. 2008-057304 filed on Mar. 7, 2008 and No. 2008-335606 filed on Dec. 29, 2008. The disclosures of all of the priority documents are incorporated herein by reference.

BACKGROUND OF THE INVENTION

1. Field of the Invention

The present invention relates to an air bag system for a vehicle to protect an occupant.

2. Description of the Related Art

Conventionally, there has been known an air bag system for a vehicle that is inflated and expanded by gas supplied from an inflator to constrain an occupant's movement so as to protect him or her at the time of a collision of the vehicle.

In such an air bag system for a vehicle, it has been proposed to provide a vent hole (discharge port) on an air bag (bag body), through which gas is discharged into the air bag.

JP H06-286569 A discloses, for example, an air bag system for a vehicle, in which, in order to reduce impact of an air bag onto an occupant when the occupant hits the air bag inflated and expanded, there is provided a slot-like vent hole and an elastic member provided across the vent hole, so that each end of the elastic member is fixed onto the air bag.

When an inflated and expanded air bag comes in contact with and presses an obstacle and the like, it is preferable to restrain inflation and expansion of the air bag by increasing the discharging rate of gas in the air bag from the vent hole. However, a conventional air bag system for a vehicle, as disclosed in JP H06-286569 A, discharges gas in the air bag from the vent hole at an approximately constant rate even when the inflated and expanded air bag comes in contact with and presses an obstacle, and discloses or suggests nothing about regulation of discharging rate of gas in the air bag.

In the air bag system disclosed in JP H06-286569 A, gas filling the air bag is constantly leaked from the vent hole during the process of inflating and expanding the air bag, which delays sufficient increase of internal pressure of the air bag by the leaked gas amount, taking more time to blow up the air bag, and consequently to hinder a quick inflation and expansion of the air bag.

In addition, it is preferable to maintain gas pressure in the air bag until an occupant is sufficiently restrained by the inflated and expanded air bag. However, the conventional air bag system for a vehicle disclosed in JP H06-286569 A keeps the vent hole open even during the inflation and expansion of the air bag, thus it is difficult to maintain the gas pressure in the air bag at a constant rate, which sufficiently restrains the occupant.

In the light of the above various difficulties, the present invention has an object to preferably regulate discharging rate of gas filling in an air bag body from a vent hole when the air bag body comes in contact with and presses an obstacle and the like during the inflation and expansion of the air bag body, but quickly expand the air bag body with the vent hole closed if not coming in contact with the obstacle as well as maintaining the gas pressure in the air bag body at a constant rate.

SUMMARY OF THE INVENTION

In one aspect of the present invention, there is provided an air bag system for a vehicle including an air bag body formed by stitching base fabric material, an inflator that charges the air bag body with gas, and a vent hole that is a through hole provided in the air bag body so as to communicate the inside with the outside of the air bag body, wherein the vent hole of the air bag body is formed to be long in one direction, and the air bag body includes: a tensile-force applying means/mechanism that applies tensile-force in the longitudinal direction of the vent hole; a pair of faces provided along a gas discharge port of the vent hole; and a flow-passage restriction membrane provided along the longitudinal direction of the vent hole.

In another aspect of the present invention, there is provided an air bag system for a vehicle including an air bag body formed in a bag form, an inflator that charges the air bag body with gas and a vent hole provided in the air bag body for discharging the gas filling the air bag body, wherein the air bag body includes: a pair of faces that is provided around the vent hole to form the vent hole in a slit-like shape extending in one direction; and a tensile-force applying section that applies tensile-force onto the pair of the faces in the longitudinal direction apart from the vent hole, and the pair of the faces becomes closed and sealed when the tensile-force applying section applies predetermined tensile-force onto the pair of the faces, and the pair of the faces become apart from each other and opened when the tensile-force applying section applies smaller tensile-force than the predetermined tensile-force onto the pair of the faces, so that the gas filling the air bag body is discharged from the opening of the vent hole.

In yet another aspect of the present invention, there is provided an air bag system for a vehicle including an air bag formed by stitching basic fabric material, an inflator that charges the air bag body with gas, and a vent hole that is a through hole provided in the air bag body so as to communicate the inside with the outside of the air bag body, wherein the vent hole for discharging the gas filling the air bag body is formed to be a long slit along the direction to restrict the expansion of the air bag.

Other features and advantages of the present invention will become more apparent from the following detailed description of the invention when taken in conjunction with the accompanying exemplary drawings.

BRIEF DESCRIPTION OF THE DRAWINGS

FIG. 10A is a perspective view showing a state in which the stitched air bag body 12 of FIG. 9A is turned over with the front side out.

FIG. 10B is a perspective view showing a state in which inner pressure is applied to the air bag body 12 after being turned over.

DETAILED DESCRIPTION OF THE PREFERRED EMBODIMENTS

Figure 1:
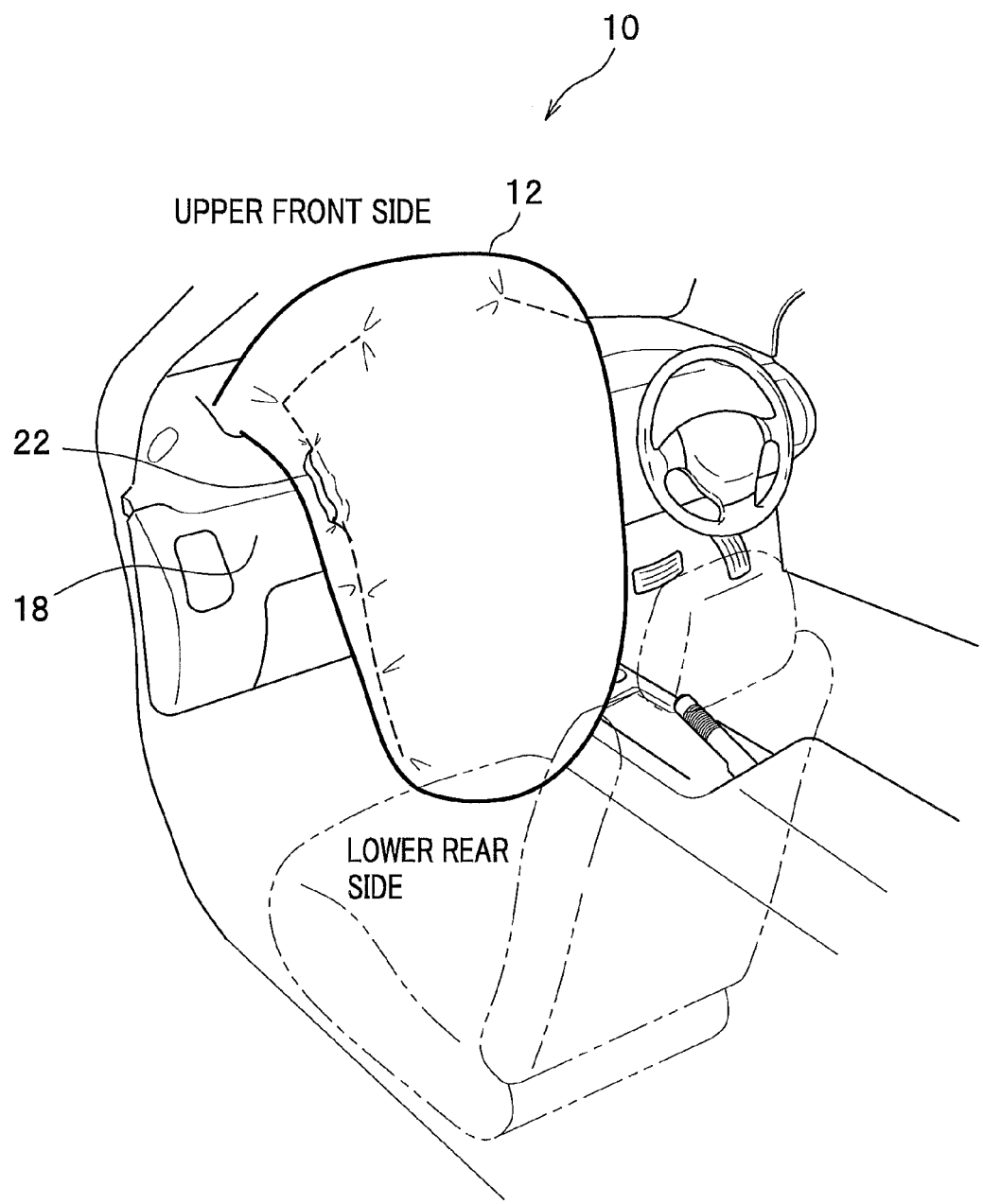
FIG. 1 is a schematic perspective view of an air bag system for a vehicle according to an embodiment of the present invention, which is installed to a front passenger seat where the air bag body is inflated and expanded.

Hereinafter, detailed descriptions will be provided on an embodiment of the present invention. FIG. 1 is a schematic perspective view of an air bag system for a vehicle according to one of preferred embodiments of the present invention, which is installed to a front passenger seat where the air bag body is inflated and expanded, FIG. 2 is a side view of FIG. 1, and FIG. 3 is a perspective view showing the air bag body that is inflated and expanded.

As shown in FIG. 1, the air bag system for a vehicle 10 (hereinafter referred to only as "the air bag system 10" in this specification) according to the embodiment of the present invention is preferably applicable to an air bag system for a front passenger seat, but not limited to this, and may be applicable to any other air bag systems such as a side air bag system and a curtain side air bag system (not shown).

Figure 2:
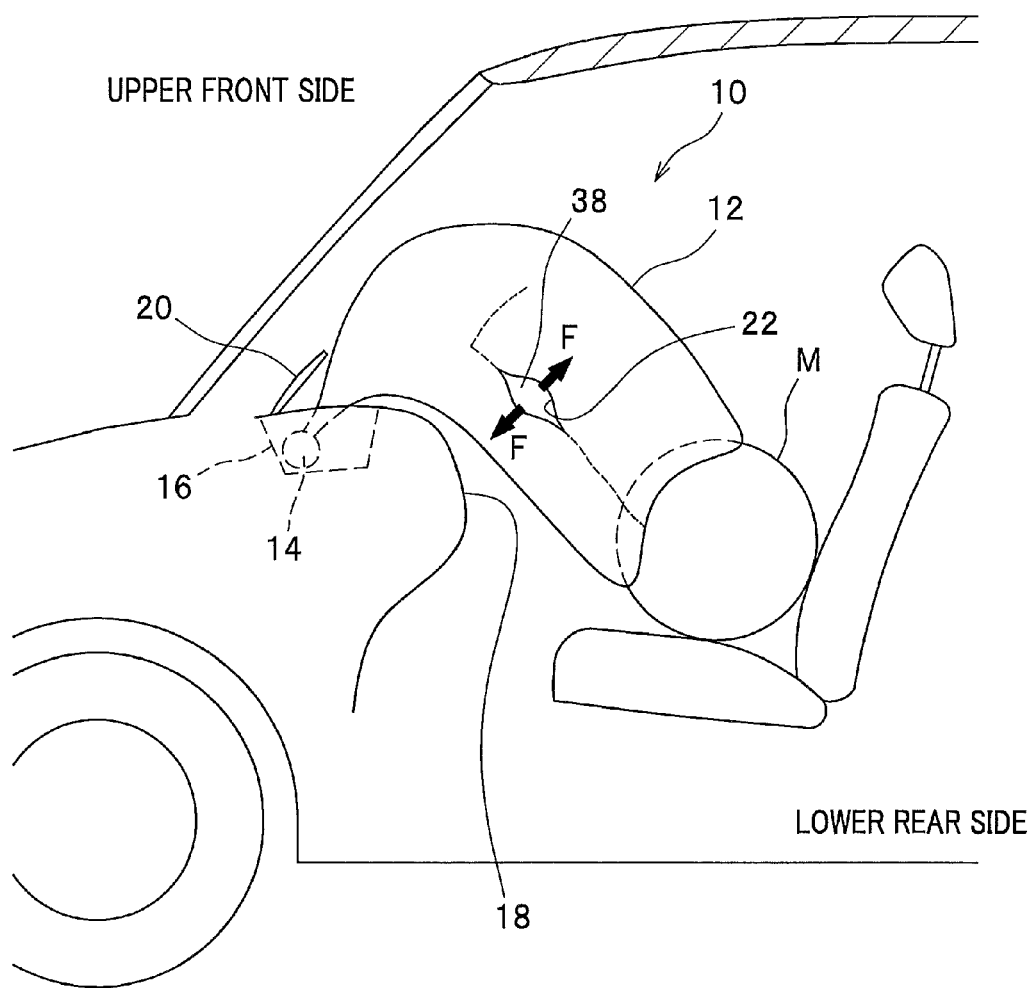
FIG. 2 is a schematic side view of FIG. 1.
Figure 3:
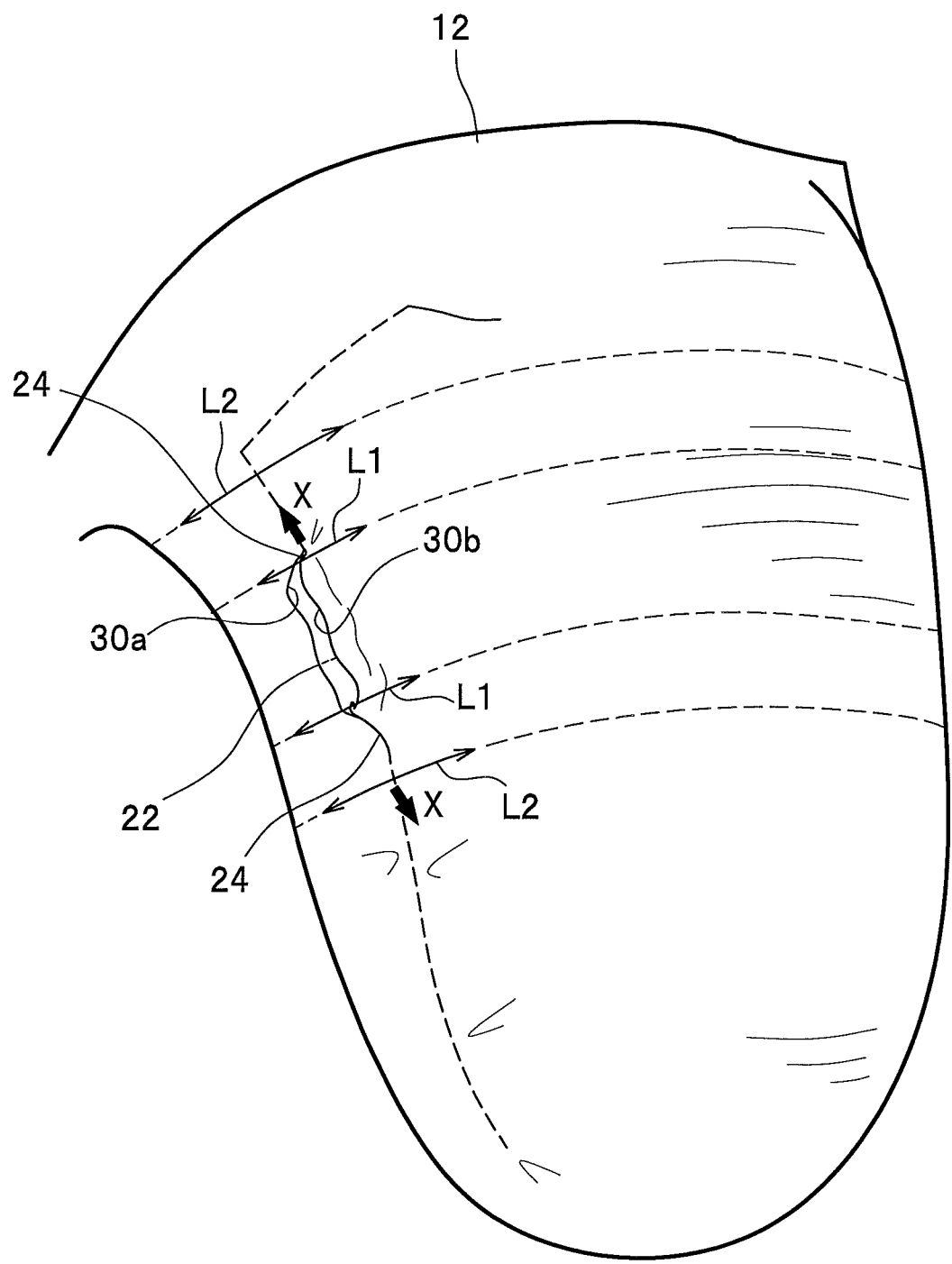
FIG. 3 is a perspective view showing a state in which the air bag body that is inflated and expanded.

The air bag system 10 according to this embodiment, as shown in FIG. 2, includes the air bag body 12 made of fabric material into a bag body shape, the inflator 14 that supplies (discharges) gas such as nitrogen gas into the air bag body 12, the housing unit 16 in which the air bag body 12 is folded and housed, and the cover member 20 that is integrally installed with the instrument panel 18 and seals the housing unit 16. The inflator 14 may be constituted by a known inflator; therefore detailed descriptions thereof will be omitted.

The air bag body 12 is a bag body made of plural base fabric pieces stitched together, and is connected to the inflator 14 via a gas feeding port not shown. On one side of the air bag body 12, as shown in FIG. 1, there is provided the vent hole 22 (also referred to as the "long slit") in a slit shape that extends in one direction from the upper front side to the lower rear side of the vehicle, functioning for discharging gas that has been supplied in the air bag body 12. The vent hole 22 may be provided on either side or both sides of the air bag body 12.

As shown in FIG. 3, on each longitudinal end of the slit-like vent hole 22, there is provided a pinched section 24 (also referred to as a "bend section") that applies tensile-force X in the direction apart from each other (i.e. opposing direction from each other) in the longitudinal direction of the vent hole 22, functioning as the tensile-force applying section (also referred to as the "tensile-force applying means"). This pinched section 24 is formed by overlapping two base fabric pieces 26a, 26b in contact with each other at their side ends with a predetermined width, and stitching the contactedly overlapped side ends together in curve toward the edge of the base fabric pieces, as shown in broken lines of FIG. 5A.

Figure 4:
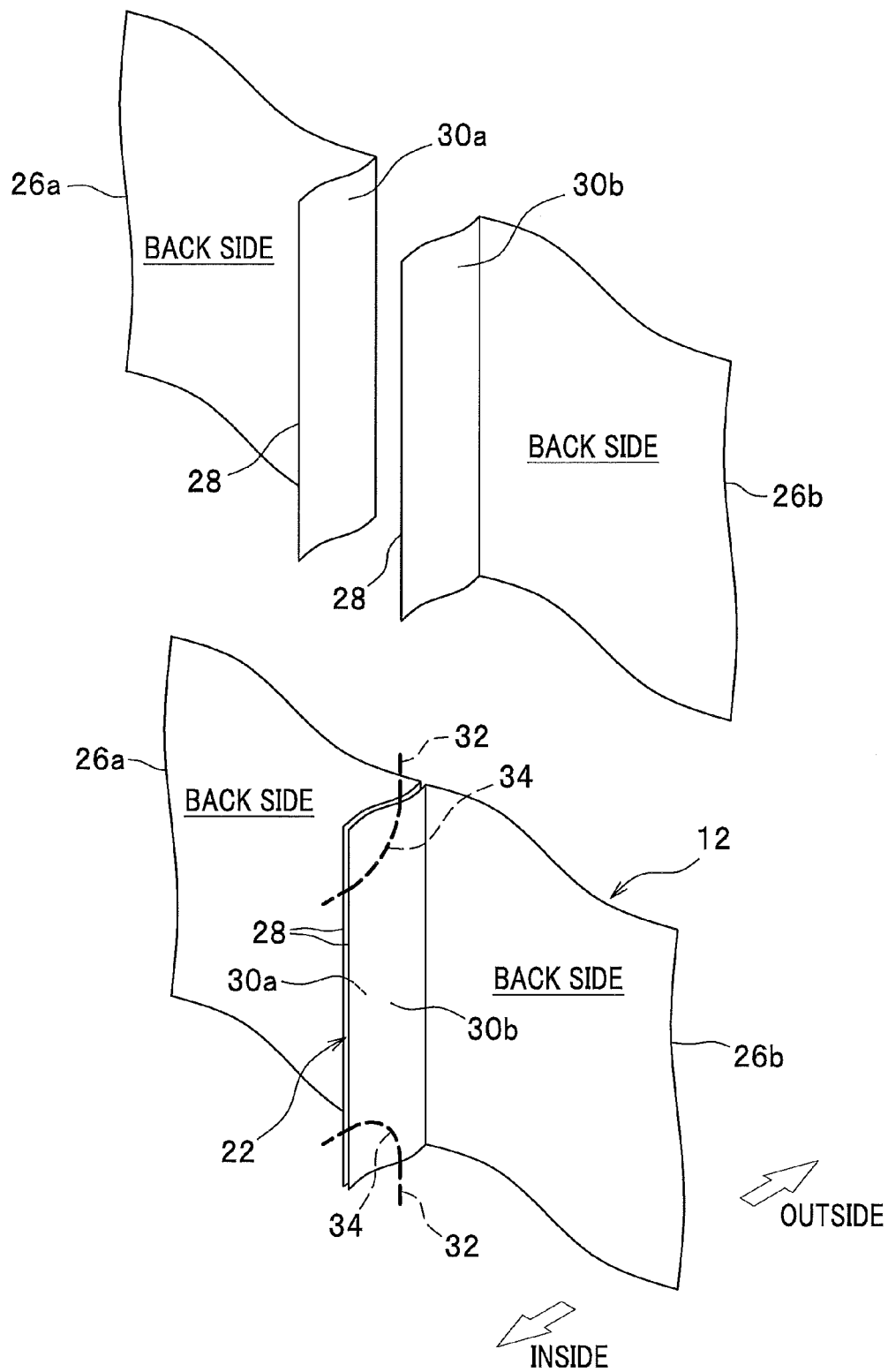
FIG. 4 is a perspective view showing how to contactedly overlap two pieces of base fabric material and stitch the two pieces in a curve line so as to form a vent hole.

Specifically, with reference to FIG. 4, the two base fabric pieces 26a, 26b of the plural base fabric pieces that constitute the air bag body 12 in a bag body are folded at their side ends 28 toward the inside of the air bag body 12 so as to form a pair of symmetric faces 30a, 30b, looking like long webs (rectangle). Next, the contactedly overlapped side ends (also referred to as the "flow-passage restriction membrane") of the faces 30a, 30b in pair are stitched together in straight lines along the longitudinal direction of the faces 30a, 30b so as to form a pair of the straight stitched lines 32, 32 and also stitched continuously from the straight stitched lines 32, 32 along a curve line to the edges of the base fabric pieces 26a, 26b so as to form a pair of the curved stitched lines 34, 34 (the "neck portion" is defined by the curved stitched lines 34, 34).

The curved stitched lines 34 are provided at the longitudinal ends of the faces 30a, 30b in pair, each apart from the other at a predetermined distance therebetween, looking like a bottle-neck shape in a side view. Between the pair of the curved stitched lines 34, 34 in a bottle neck shape, there is provided a non-stitched portion where the curved stitched lines 34, 34 are not joined by stitching. When the gas filling the air bag body 12 is discharged from this non-stitched portion, the faces 30a, 30b in pair come apart from each other and are opened, so as to form the vent hole 22. Note that the faces 30a, 30b in pair stay not outside but inside the air bag body 12, facing the space therewithin, after the stitched air bag body is turned over with the front side out.

There is provided the pinched section 24 at each longitudinal end of the slit-like vent hole 22, thereby to set the circumferential length L1 of the air bag body 12 passing through the longitudinal end of the vent hole 22 to be shorter than the circumferential length L2 extending outer side from the bend hole 22 in the longitudinal direction (L1<L2), as shown in FIG. 3.

Figure 5A:
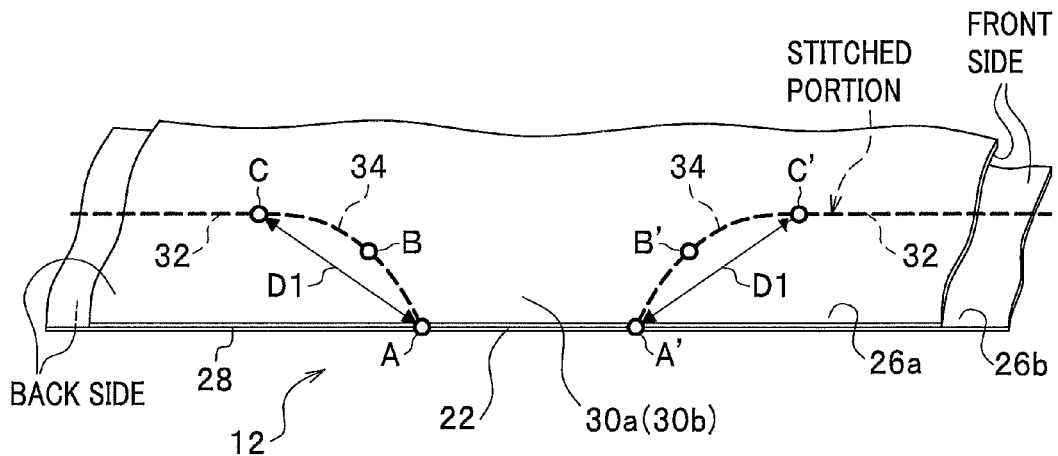
FIG. 5A is a plan view simplifying the stitched portion of FIG. 4.
Figure 5B:
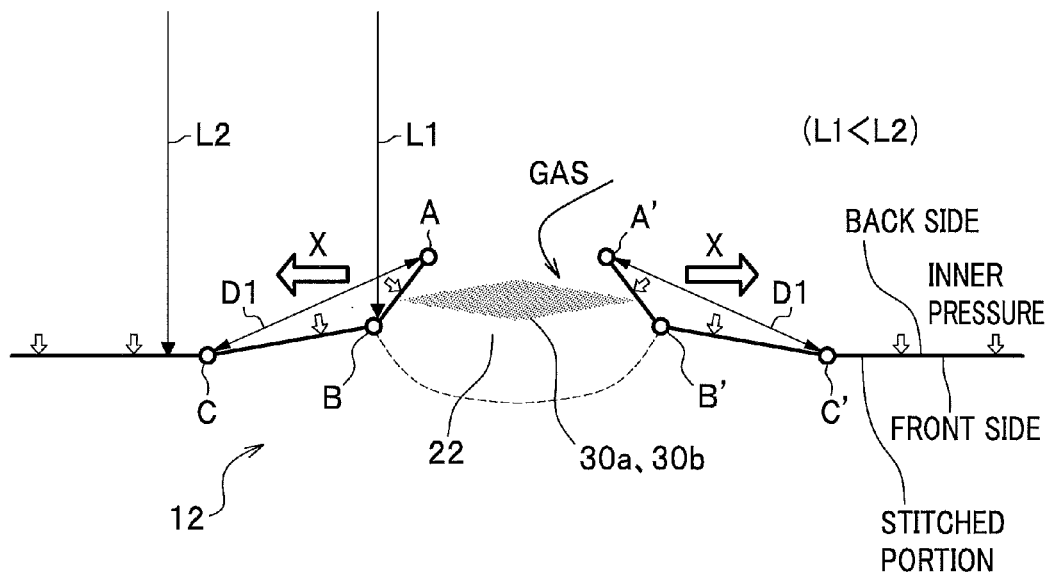
FIG. 5B is a transparent view showing a state in which inner pressure is applied by the filling gas after turning over the bag body 12 stitched at the stitched portion of FIG. 4 front side out.

FIG. 5A is a plan view simplifying the stitched portion of FIG. 4, and FIG. 5B is a transparent view showing a state in which inner pressure is applied by the filling gas after turning over the bag body 12 front side out after stitching is completed.

As shown in FIG. 5A, the contactedly overlapped side ends of the two base fabric pieces 26a, 26b are stitched with thread, as shown in the broken lines, so as to form the stitched line constituted by the straight stitched line 32 and the curved stitched line 34. In FIG. 5A, the point A(A') represents the longitudinal end of the vent hole 22, the point C(C') represents the terminal point of the straight stitched line 32, and the point B(B') represents an arbitrary point between the point A(A') and the point C(C') on the curved stitched line 34. After the air bag body 12 is stitched in the above manner, and is turned over with the front side out at the boundary of the stitched line, inner pressure is applied by the filling gas into the air bag body 12 from the inflator 14, so that the contactedly overlapped side ends of the contactedly overlapped faces 30a, 30b in pair, functioning as the flow-passage restriction membrane, are stretched at the point B(B') by the tensile-force X (see the bold arrows X) acting in the direction apart from each other so that the slit-like vent hole 22 is closed. Note that at the time of stitching the air bag body 12 shown in FIG. 5A, the stitching is carried out with the back side of the finished air bag body 12 of FIG. 5B outside. Stitching is carried out in the same manner in FIGS. 7A and 7B described later.

Specially, due to the shape restriction effect of triangle formed by the points A(A'), B(B'), C(C') as shown in FIG. 5B, the distance D1 between the points A (A') and C(C') is maintained at a constant distance, respectively, so that the point B(B') remains inner side of the air bag body 12 from the point C(C'). Hence, the circumferential length L1 passing through the point B(B') becomes shorter than the circumferential length L2 disposed outer side from the vent hole 22 in the longitudinal direction (L1<L2). The portion between the points B and B' is slightly extensible (see the broken line of FIG. 5B) so that membrane stress is concentrated, thus the faces 30a, 30b in pair are closed to cause sealing effect.

The form of the stitched line of the air bag body 12 is not limited to FIG. 4. Hereinafter, variations of the stitched lines will be exemplified.

Note that the "stitched section" denotes the entire components that constitute the air bag body 12 by stitching at least two pieces of the plural base fabric pieces, and includes the stitched portion, non-stitched portion, the stitched lines in each shape, the vent hole, and the pair of the faces as well as other components accompanied by those components.

<Variation 1>

Figure 6:
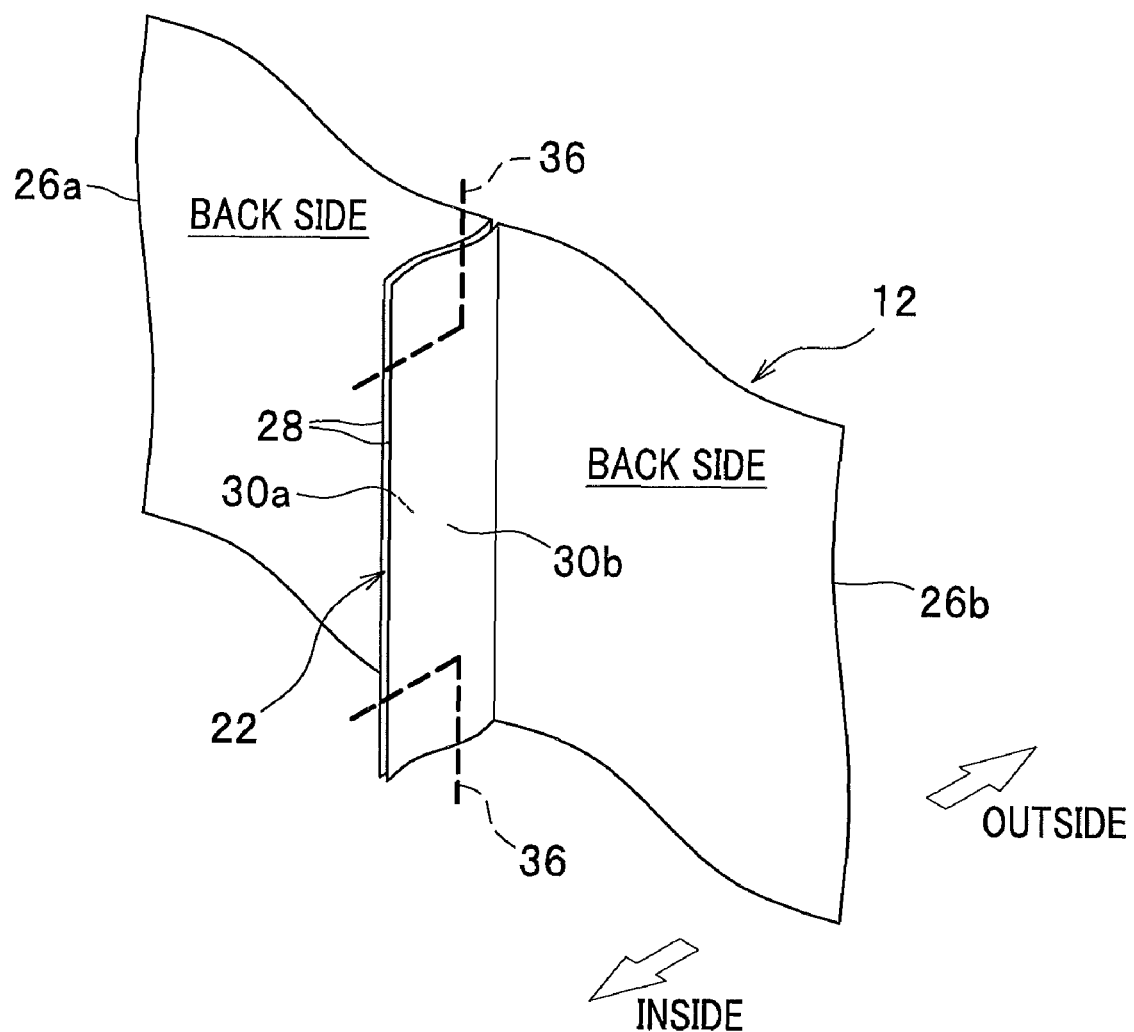
FIG. 6 is a perspective view showing the stitched portion with an L-shaped line provided on the contactedly overlapped two pieces of the base fabric material.
Figure 7A:
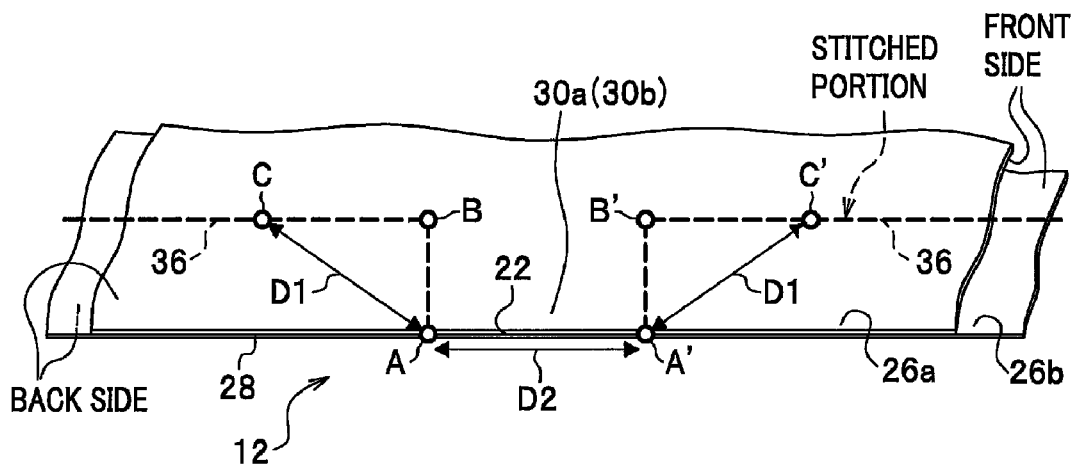
FIG. 7A is a plan view simplifying the stitched line of FIG. 6.
Figure 7B:
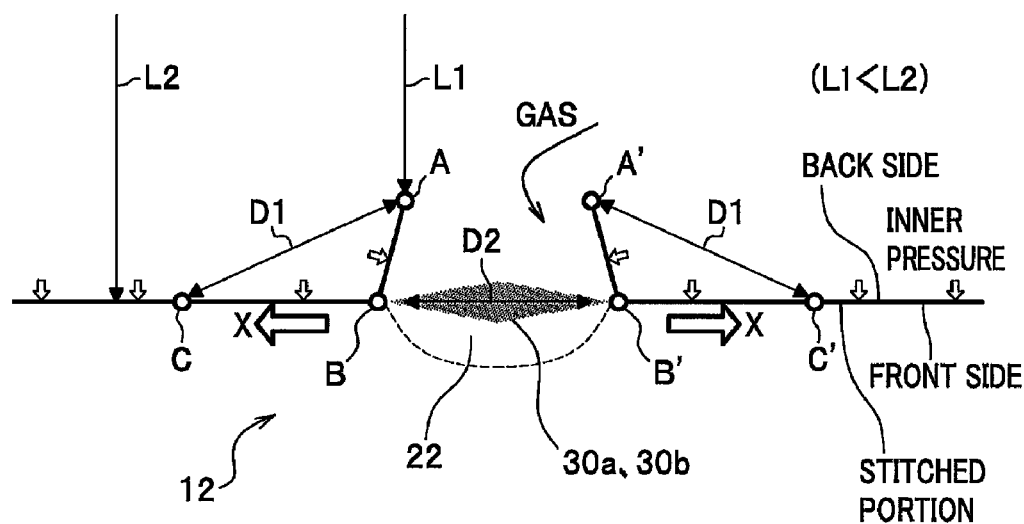
FIG. 7B is a transparent view showing a state in which inner pressure is applied by the filling gas after the stitched air bag body 12 is turned over with the front side out.

FIG. 6 is a perspective view of a stitched line according to the variation 1, FIG. 7A is a plan view simplifying the stitched line of FIG. 6, and the FIG. 7B is a transparent view showing a state in which inner pressure is applied by the filling gas after the stitched air bag body 12 is turned over with the front side out.

As shown in FIG. 6, a pair of the L-shape stitched lines 36, 36 (the "neck portion" is defined by the pair of the L-shape stitched lines 36, 36), bent in an approximate L-shape, are formed on the side ends 28 (also referred to as the "contactedly overlapped side ends") of the two base fabric pieces 26a, 26b with a predetermined distance therebetween, which defines a slit-like vent hole 22 therebetween.

In FIG. 7A, the point A(A') represents the longitudinal end of the vent hole 22, the point B(B') represents the terminal point of the straight stitched line 32, and the point C(C') represents an arbitrary point on the straight stitched line 32, at an appropriate distance from the point B(B').

After the air bag body 12 stitched along the pair of the L-shape stitched line, as shown in FIG. 7A, is turned over with the front side out, inner pressure is applied by the filling gas in the air bag body 12 from the inflator 14, so that the contactedly overlapped side ends of the faces 30a, 30b in pair, functioning as the flow-passage restriction membrane, are stretched at the point B(B') by the tensile-force X (see the bold arrows X) acting in the direction apart from each other so that the slit-like vent hole 22 is closed, as shown in FIG. 7B.

Specially, due to the shape restriction effect of triangle formed by the points A (A'), B (B') and C (C') of the L-shape stitched line 36, the distance D1 between the points A (A') and C(C'), and the distance D2 between the points A and A' (also see the distance D2 of FIG. 7A) are maintained at a constant distance, respectively, so that the point A (A') tends to move toward the outside of the air bag body 12, but its movement is restricted by the point C(C') so that the point A(A') remains in the inner side of the air bag body 12 from the point B (B'). Hence, the circumferential length L1 passing through the point A (A') becomes shorter than the circumferential length L2 disposed outer side from the vent hole 22 in the longitudinal direction (L1<L2). The circumferential length of the portion between the points B and B' is slightly extensible (see the broken line of FIG. 7B) so that membrane stress is concentrated, thus the faces 30a, 30b in pair are closed to cause sealing effect.

<Variation 2>

Figure 8:
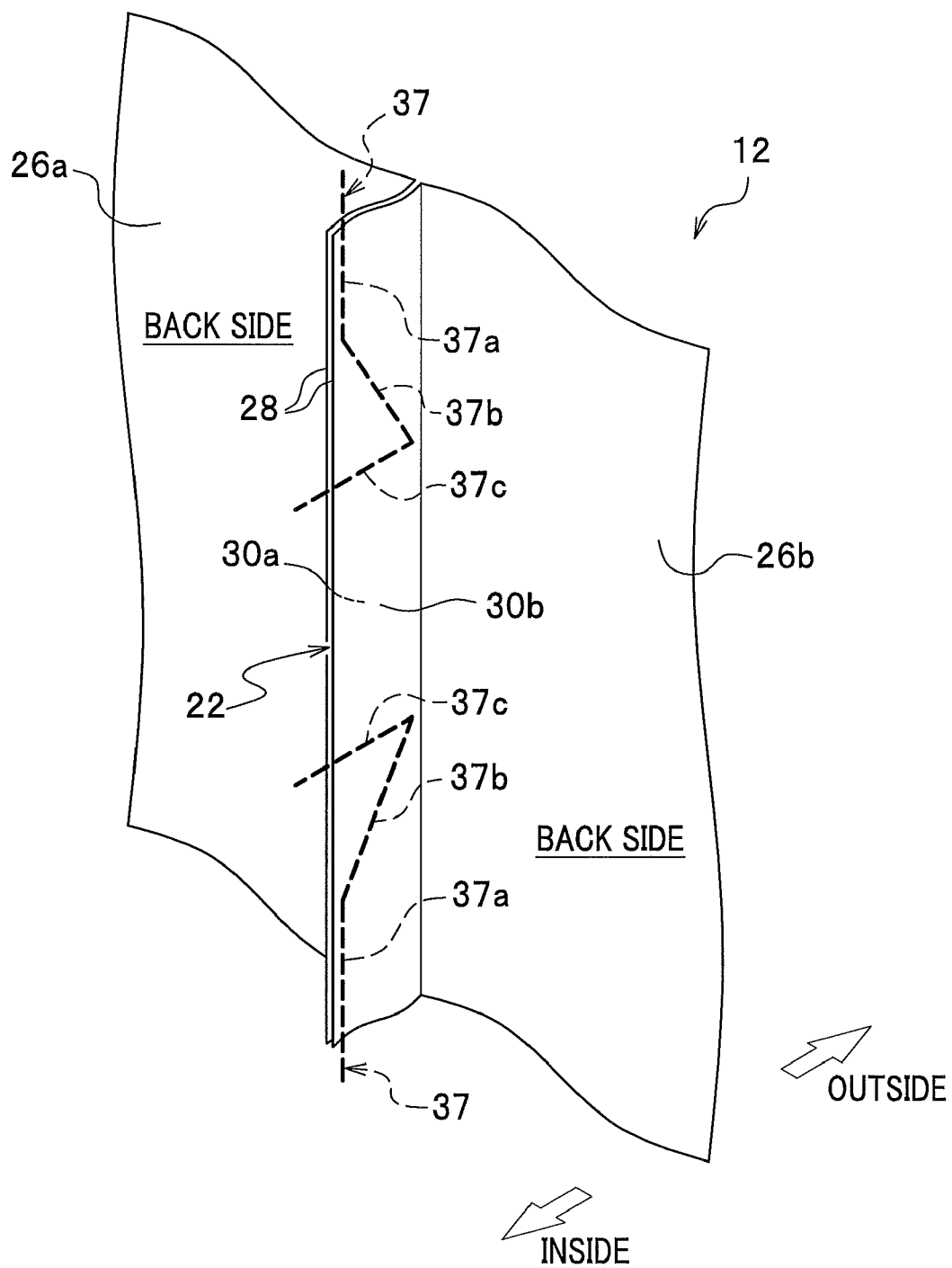
FIG. 8 is a perspective view showing the stitched portion with a V-shaped line provided on the contactedly overlapped two pieces of the base fabric material, according to the second variation of the present embodiment.
Figure 9A:
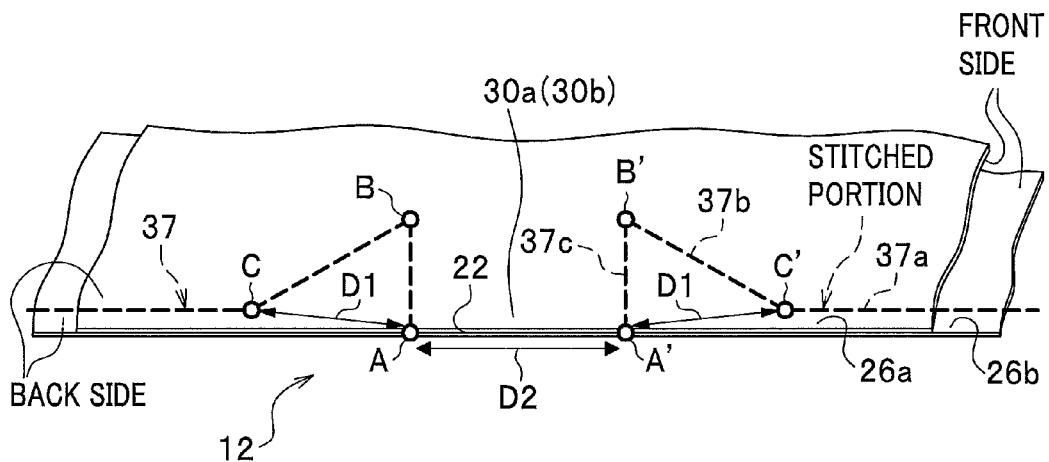
FIG. 9A is a plan view simplifying the stitched portion of FIG. 8.
Figure 9B:
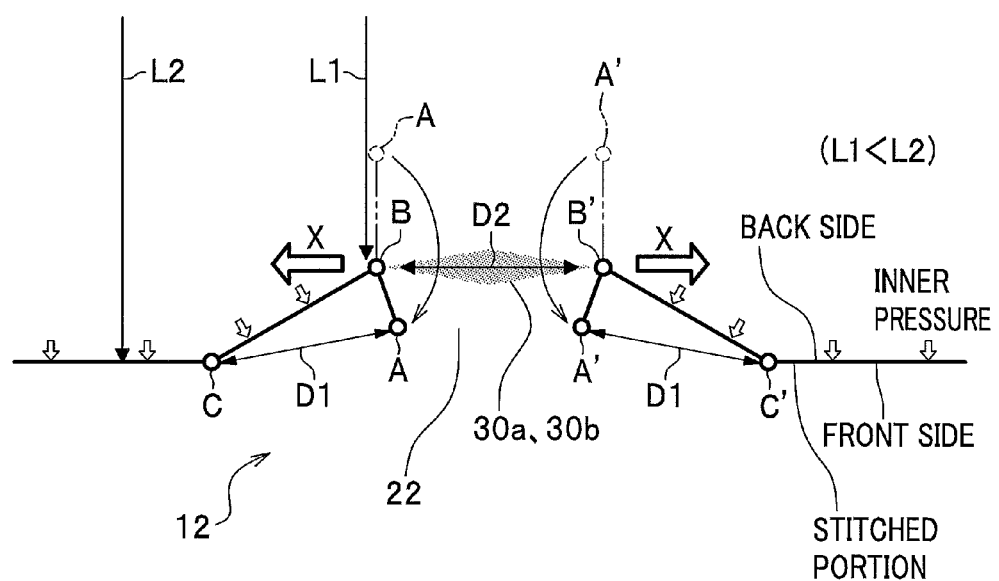
FIG. 9B is a transparent view showing a state in which inner pressure is applied by the filling gas after the stitched air bag body 12 is turned over with the front side out.

FIG. 8 is a transparent view showing the stitched line according to the variation 2, FIG. 9A is a plan view simplifying the stitched line of FIG. 8, and the FIG. 9B is a transparent view showing a state in which inner pressure is applied by the filling gas after the stitched air bag body 12 is turned over with the front side out, and FIG. 10A is a perspective view showing a state in which the stitched air bag body 12 of FIG. 9A is turned over with the front side out, and FIG. 10B is a perspective view showing a state in which inner pressure is applied to the air bag body 12 after being turned over.

As shown in FIG. 8, a pair of the V-shape stitched lines 37, 37 (the "neck portion" is defined by the pair of the V-shape stitched lines 37, 37), bent in a sharply angled V-shape, are formed on the side ends 28 (also referred to as the "contactedly overlapped side ends") of the two base fabric pieces 26a, 26b with a predetermined distance therebetween, and the V-shape stitched lines 37, 37 define a slit-like vent hole 22 therebetween.

As shown in FIG. 8 and FIG. 9A, each V-shape stitched line 37 includes the first portion 37a extending approximately parallel to the edge line of the side end 28, the second portion 37b inclining from the terminal point of the first portion 37a toward the outer side (the direction to the folding line of the contactedly overlapped side end) of the air bag body 12 when turned over with the front side out, and the third portion 37c sharply bent from the terminal point of the second portion 37b toward the side end 28 side.

In FIG. 9A, the point A(A') represents the longitudinal end of the vent hole 22, the point B(B') represents the terminal point of the second portion 37b, and the point C(C') represents the terminal point of the first portion 37a.

After the air bag body 12 stitched along the pair of the V-shape stitched lines is turned over with the front side out, as shown in FIG. 9A, when inner pressure is applied by the filling gas into the air bag body 12 from the inflator 14, the point B(B') is located on the inner side and the point C(C') is located on the outer side of the air bag body 12 because the circumferential length L1 passing through the point B(B') is set to be shorter than the circumferential length L2 passing through the point C(C'), as shown in FIG. 9B.

Specially, due to the shape restriction effect of triangle formed by the points A (A'), B (B') and C (C') of the V-shape stitched line 37, the distance D1 between the points A (A') and C(C') and the distance D2 between the points B and B' are maintained at a constant distance, respectively, so that the point A (A') moves from the inner side toward the outer side of the air bag body 12, and the movement of the point B(B') is restricted and remains inside the air bag body 12, and the tensile-force X (see the bold arrows X) is generated on the point B(B') in the direction apart from each other so that the vent hole 22 is closed.

In a state of FIG. 10A, in which the air bag body 12 stitched along the V-shape stitched lines 37 is turned over with the front side out but no inner pressure is applied, the point A(A') stays within the air bag body 12. In a state of FIG. 10B, in which the stitched air bag body 12 is turned over with the front side out and inner pressure is applied in the air bag body 12, the point A(A') protrudes toward the outer side of the air bag body 12 and gets exposed outside.

<Variation 3>

Figure 11:
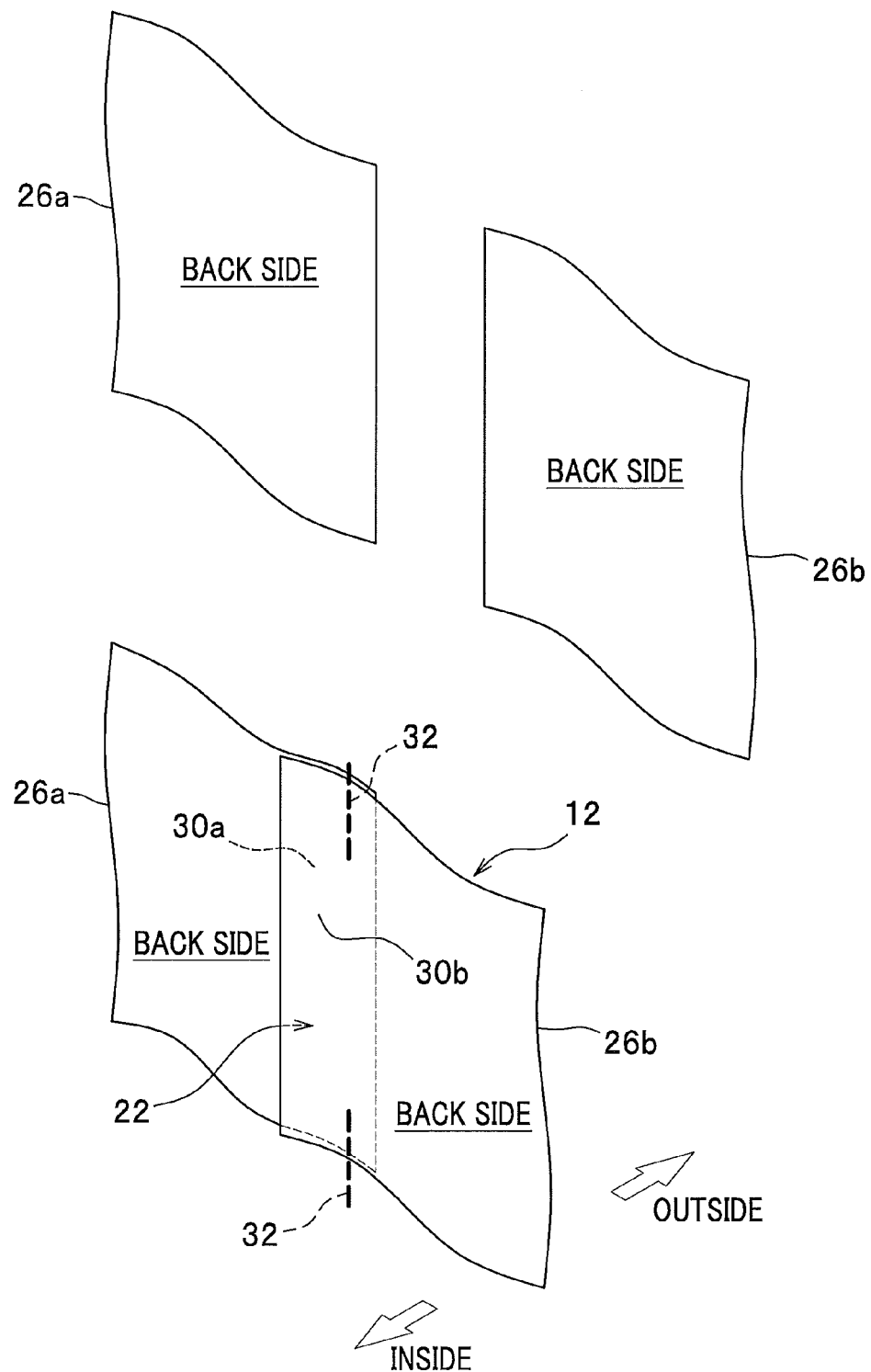
FIG. 11 is a perspective view showing the stitched portion with a straight line provided on the contactedly overlapped two pieces of the base fabric material, according to the third variation of the present embodiment.
Figure 12:
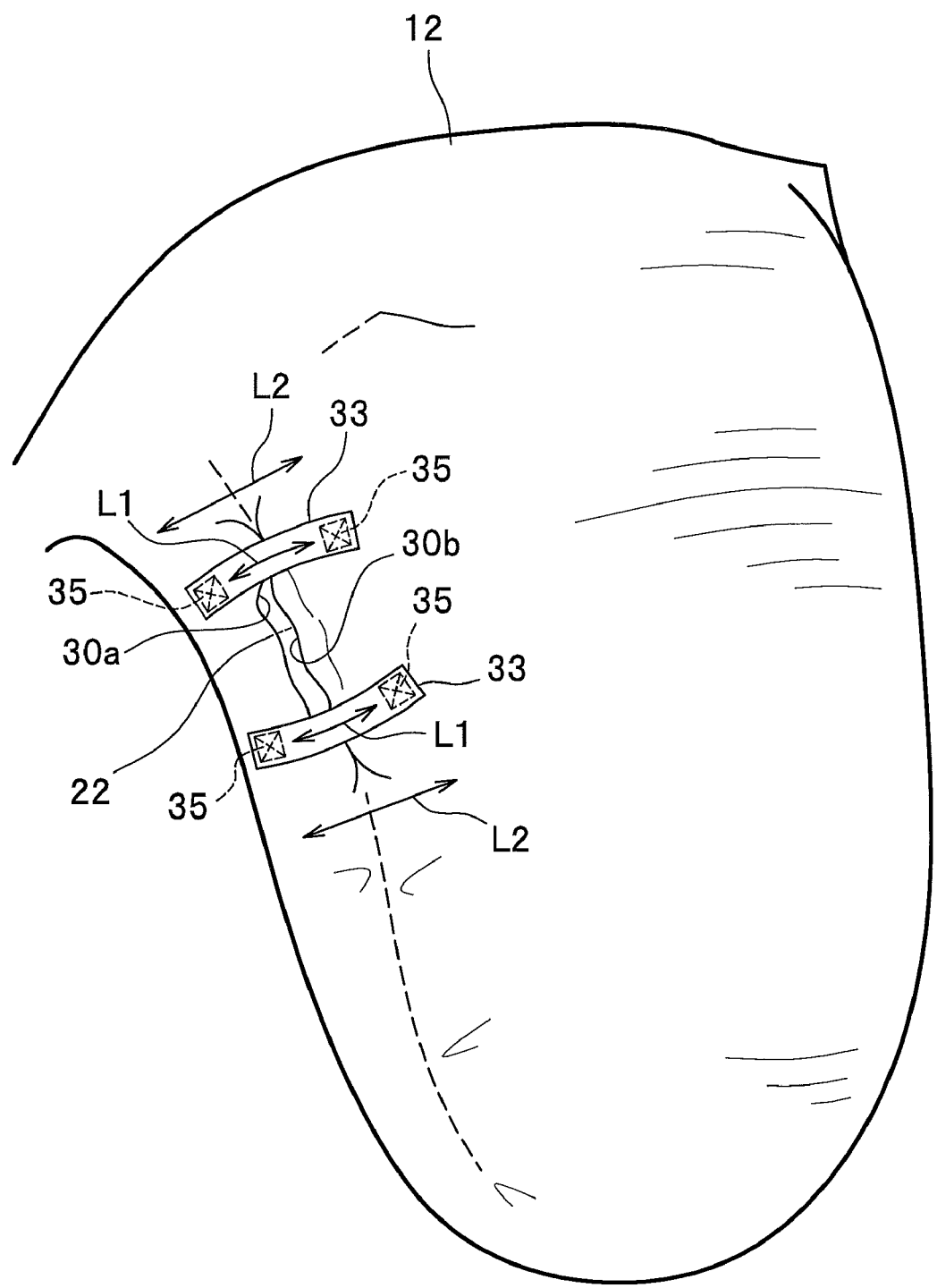
FIG. 12 is a perspective view showing a variation of applying tensile-force using a strap member.

FIG. 11 is a perspective view of the stitched line according to the third variation. Without folding the side ends 28 of the pair of the base fabric pieces 26a, 26b, on its contactedly overlapped side ends of the air bag body 12, a pair of the straight stitched lines 32, 32 are provided at a predetermined distance therebetween, which forms a slit-like vent hole 22 therebetween.

The above-mentioned pair of the stitched lines 32, 32 on the side ends along the longitudinal direction of the slit-like vent hole 22 may be in various shapes, serving as an end-support to support both the side ends of the faces 30a, 30b in pairs. This pair of the stitched lines securely fix the faces 30a, 30b in pair to come in contact with each other, so as to provide sealing effect. In addition, the air bag body 12 is constituted by plural base fabric pieces, and at least two base fabric pieces 26a, 26b of the plural base fabric pieces are stitched, where the vent hole 22 is provided. Accordingly, this can facilitate manufacturing of the air bag body 12 and mass-production can be realized.

Furthermore, as a means of applying the predetermined tensile-force onto the vent hole 22, other than the above-mentioned stitched lines on the two contactedly overlapped base fabric pieces 26a, 26b, a pair of straps 33, 33 (also referred to as a "strap member") provided in the vicinity of the both longitudinal ends of the vent hole 22 may be used, thereby to reduce the circumferential length L1 of the air bag body 12, passing through these longitudinal ends of the vent hole 22. Each end of the strap 33 is fixed to the air bag body 12 by the stitched portion 35. The strap 33 facilitates applying of a predetermined tensile-force onto the vent hole 22. Note that the strap 33 may be provided on either end of the vent hole 22.

The air bag system 10 according to this embodiment is basically constituted as mentioned above, and hereinafter operational effects of the system 10 will be provided.

First, normal effects of the inflation and expansion when the air bag body 12 does not come in contact with an obstacle M.

At the time of a vehicle collision, the inflator 14 starts to operate in response to control signals sent from the controller (not shown), and the inflator 14 injects gas into the air bag body 12, thereby to open the cover member 20 installed on the instrument panel 18.

The gas supplied from the inflator 14 via the gas inflow port (not shown) pushes the inner wall of the air bag body 12, so that the air bag body 12 becomes inflated and expanded toward the front passenger seat side, as shown in FIG. 1. Then, the inflated and expanded air bag body 12 comes in contact with and presses an occupant (not shown) and restricts his or her movement so as to be protected.

When the air bag body 12 becomes inflated and expanded by gas supplied into the air bag body 12, suppress strength pushing the inner wall of the air bag body 12 toward the outer side is generated due to surface pressure of the gas pressure, and then this suppress strength generates the tensile-force X that pulls both the longitudinal ends of the slit-like vent hole 22 apart from each other in the longitudinal direction (opposite direction) of the vent hole 22.

This tensile-force X causes the faces 30a, 30b in pair around the slit-like vent hole 22 to be closed, and the contact between the faces 30a, 30b is maintained so that sealing effect works. Since the faces 30a, 30b are closed, the vent hole 22 is also closed, thereby to reduce gas leakage from the vent hole 22.

Specifically, the tensile-force applying section (tensile-force applying means/mechanism) is set in such a manner that there are provided the pinched sections on both the longitudinal end sides of the slit-like vent hole 22, so as to provide difference in the circumferential length between around both the longitudinal ends of the slit-like vent hole 22 (L1) and around the outer side from the vent hole 22 (L2). Whereby, membrane stress (tensile-force) shown in the bold arrow X of FIG. 3 is applied onto the vent hole 22 from each side end of the vent hole 22 having a shorter circumferential length (L1) toward the outer side having a longer circumferential length (L2), due to gas pressure pushing from the inner wall side of the air bag body 12.

This tensile-force X is applied onto the faces 30a, 30b in pair constituting of the vent hole 22, so that the vent hole 22 constituted by the faces 30a, 30b becomes almost completely closed, causing sealing effects.

Note that surface pressure of the gas pressure in the air bag body 12 pushes the contactedly overlapped side ends of the faces 30a, 30b in pair facing the inner wall side of the air bag body 12, and the combination of this pushing force onto the faces 30a, 30b in contact with each other and the tensile-force X that pulls the vent hole 22 in the above direction further enhances sealing effects.

According to the present embodiment, the above-mentioned seal effects almost completely seal the vent hole 22 so that gas leakage from the vent hole 22 can be significantly reduced, thus this embodiment reduces gas leakage to the external, which is a problem of a conventional technique, thereby to enhance gas charging efficiency.

Next, descriptions will be provided on a case in which the air bag body 12 comes in contact with and presses the obstacle M during its inflation and expansion.

As shown in FIG. 2, when the air bag body 12 comes in contact with and presses the obstacle M, the air bag body 12 gets deformed by the obstacle M, and this deformation reduces the tensile-force X that pulls the vent hole 22 at both the longitudinal ends apart from each other. As the tensile-force X is reduced, the force F to open the slit-like vent hole 22 in the vertical direction to the longitudinal direction of the vent hole 22 eventually exceeds the tensile-force X, so that the faces 30a, 30b in pair come apart and opened, whereby the vent hole 22 opens, too (see FIGS. 13 to 14B).

Specifically, the slit-like vent hole 22 is formed to extend along one direction from the upper front side to the lower rear side of the vehicle, the direction to reduce the inflation and expansion force of the air bag body 12. Therefore, when the air bag body 12 during its inflation and expansion comes in contact with and presses the obstacle M located in the vent hole's extending direction, the tensile-force X, which pulls the faces 30a 30b in pair apart from each other along the longitudinal direction of the vent hole 22, is unstrained and becomes smaller compared to that during the inflation and expansion before coming in contact with the obstacle M.

In other words, since the vent hole 22 is formed as a long slit along the direction in which the air bag body's 12 expansion is restricted, when the air bag body 12 during its inflation and expansion comes in contact with and presses an obstacle M located along the direction to restrict the expansion of the air bag body 12, the tensile-force X, which pulls the each longitudinal end of the faces 30a 30b in pair apart from each other along the longitudinal direction of the vent hole 22, is unstrained and becomes smaller than the tensile-force X during the inflation and expansion before coming in contact with the obstacle M.

Figure 13:
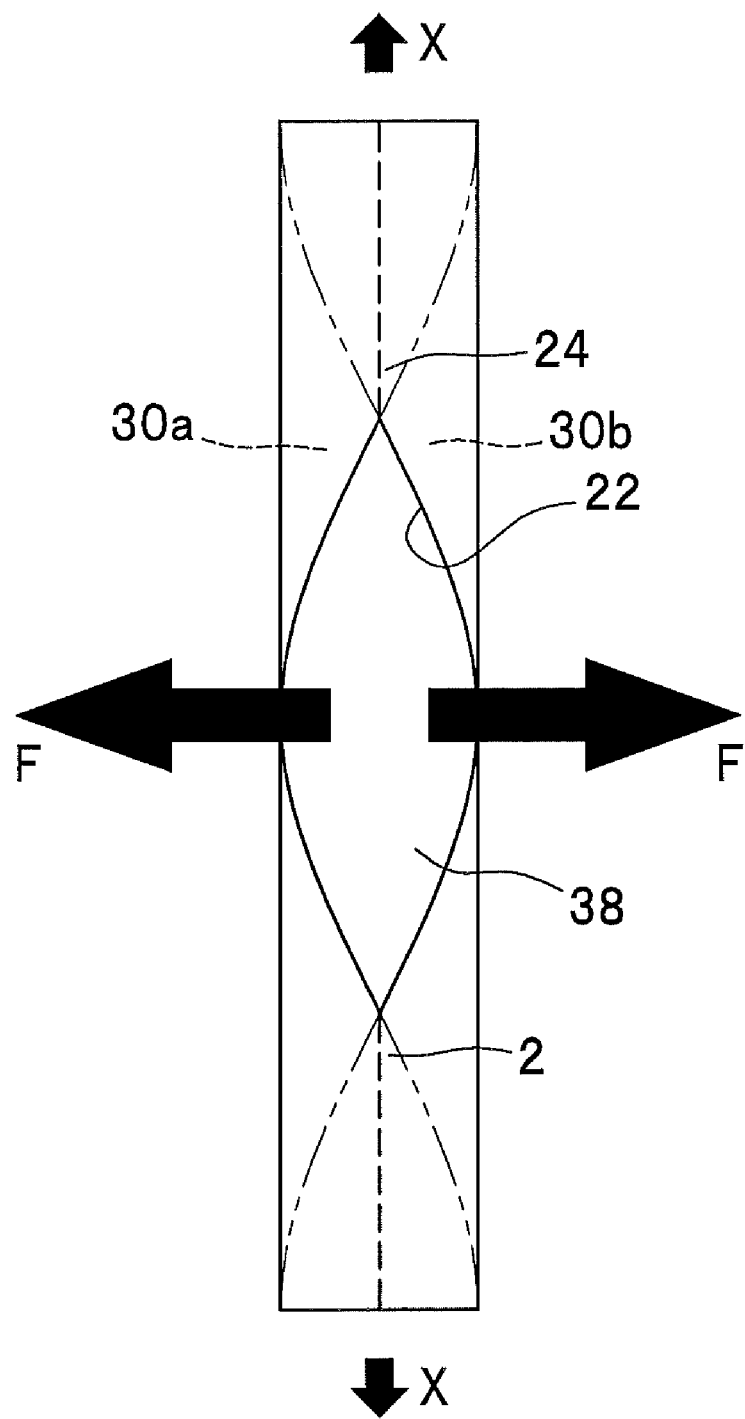
FIG. 13 is an enlarged plan view showing a state in which smaller tensile-force that pulls the pair of the faces in the longitudinal direction is applied onto the faces so that the pair of the faces becomes apart from each other and opened.
Figure 14A:
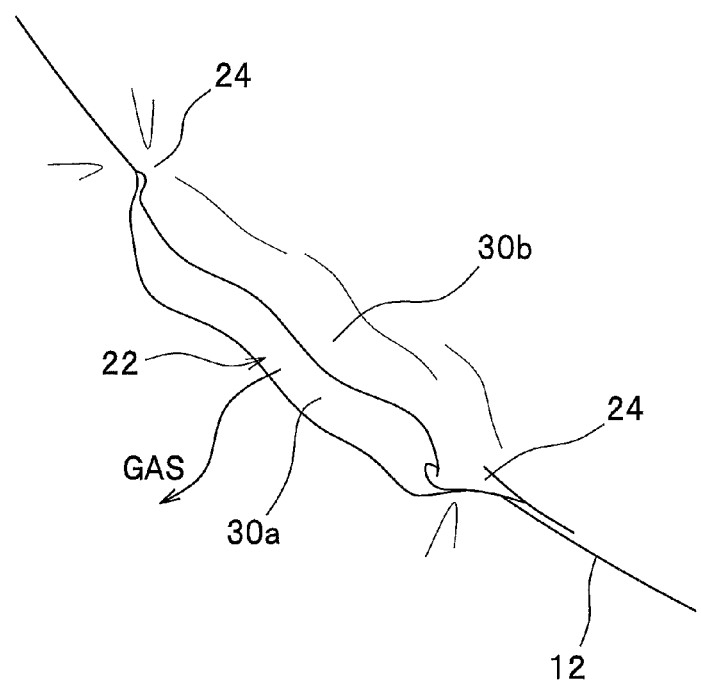
FIG. 14A is a partial perspective view showing a state in which gas is discharged from the vent hole while the air bag is inflated and expanded.
Figure 14B:
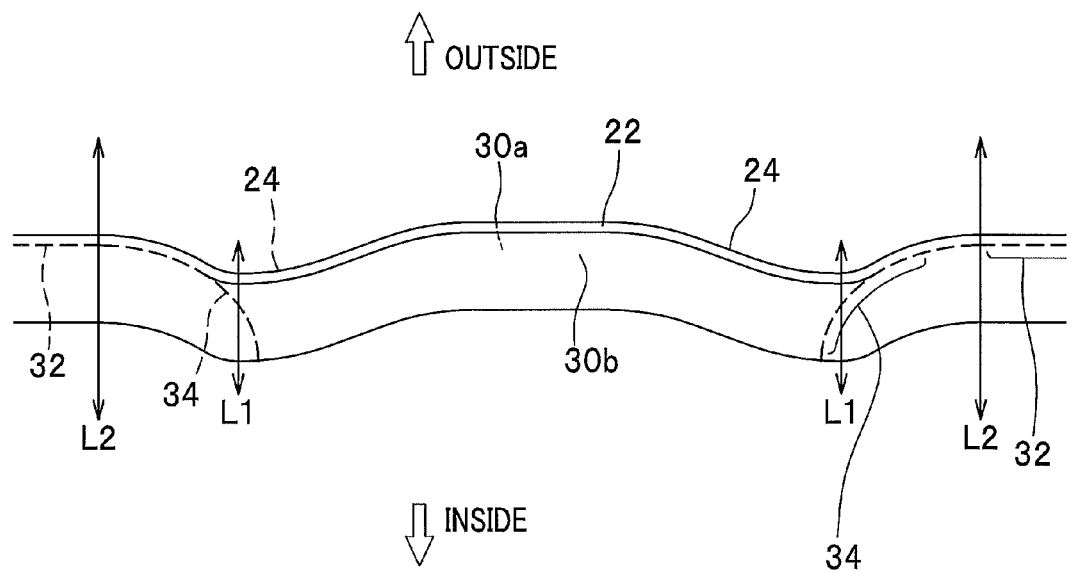
FIG. 14B is a transparent side view of the vent hole of the air bag body being closed while the air bag body of FIG. 4 is expanded.

Accordingly, the faces 30a, 30b in pair constituting the vent hole 22 become apart from each other, being pushed by the gas pressure of the gas filling the air bag body 12 because the tensile-force X becomes unstrained (smaller), and then get apart enough from each other to form a relatively wide opening 38 (see FIG. 13). As a result, by releasing the filling gas from the wide opening 38 of the vent hole 22, energy (load) applied through the air bag body 12 onto the obstacle M can be reduced, so that excessive energy applied onto the obstacle M can be preferably prevented.

Specifically, the direction where the tensile-force X is applied to the vent hole 22 is set to be in accordance with the direction where the air bag body 12 comes in contact with the obstacle M; thus, when the air bag body 12 during its inflation and expansion comes in contact with and presses the obstacle M, the tensile-force X, pulling the slit-like vent hole 22 at both the longitudinal ends of the faces 30a, 30b apart from each other in the longitudinal direction, becomes eased, and the faces 30a, 30b in pair get apart from each other and the slit-like vent hole 22 is widely opened, thus the gas filling the air bag body 12 is preferably discharged from the vent hole 22. As mentioned above, the present embodiment provides a proper regulation of discharging rate of the gas filling the air bag body 12 from the vent hole 22 through the faces 30a, 30b in pair, depending on the inflation and expansion states of the air bag body 12; a normal inflation/expansion state in which the air bag body 12 is out of contact with the obstacle M during its inflation and expansion, or a state in which the air bag body 12 comes in contact with and presses the obstacle M during its inflation and expansion.

Next, variations of the faces 40a, 40b in pair will be described hereinafter, with reference to FIGS. 15 and 16.

Figure 15:
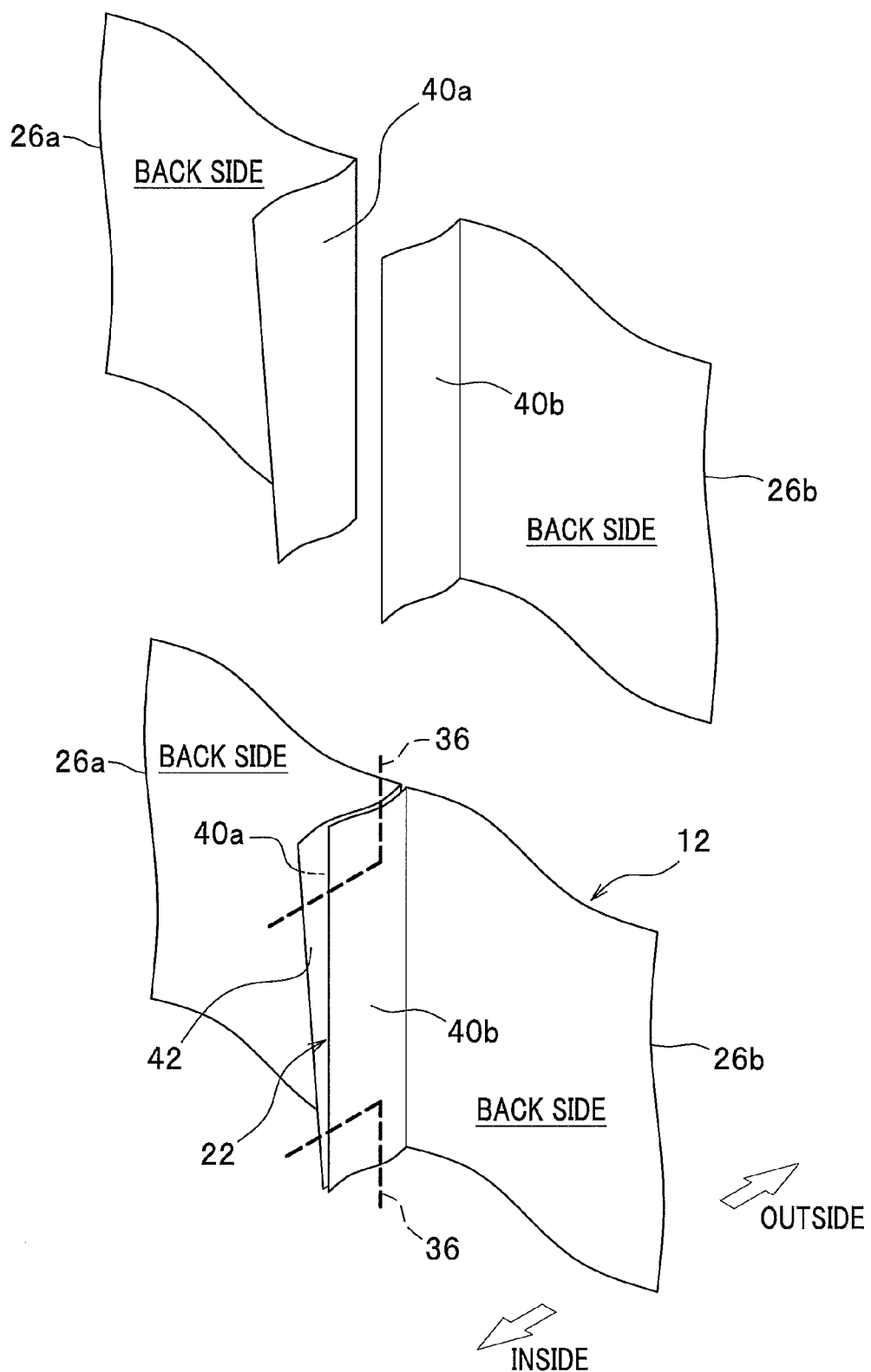
FIG. 15 is a view for explaining a variation of the pair of the faces in an asymmetrical shape.
Figure 16:
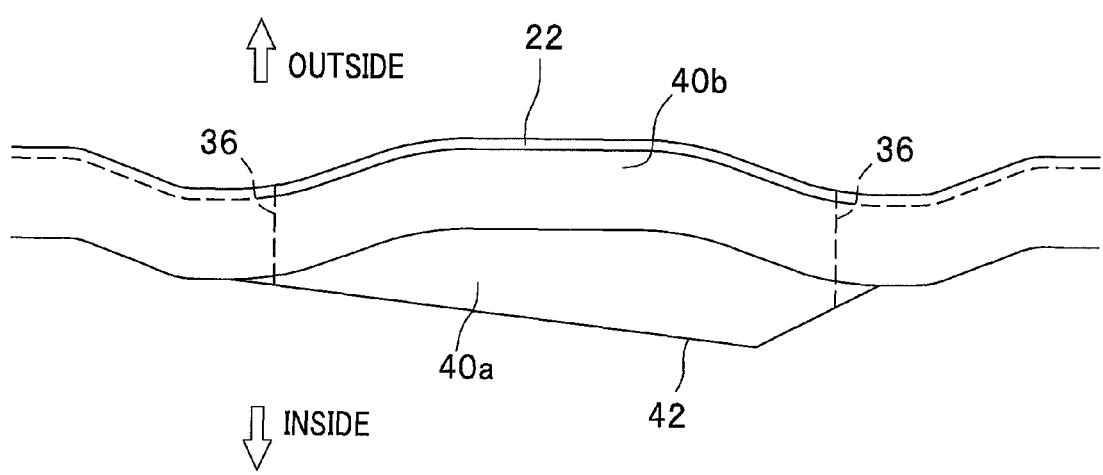
FIG. 16 is a transparent side view of the vent hole of the air bag body being closed while the air bag body of FIG. 15 is expanded.

FIG. 15 is a perspective view of one variation of the faces 40a, 40b in pair in an asymmetric manner, and FIG. 16 is a transparent view, seen from the lateral direction, of a state in which the vent hole 22 is closed when the air bag body 12 having the faces 40a, 40b in pair is expanded.

Contrary to the faces 30a, 30b in pair shown in FIGS. 4, 6, 8, both made in a symmetrical shape; the faces 40a, 40b in pair according to this variation are each made asymmetrical, such that the face 40a is formed in a trapezoidal shape and the face 40b is formed in a long rectangular shape.

At this time, the face 40a has a triangular portion 42 which is not contactedly overlapped with the rectangular face 40b, and this non-overlapped triangular portion 42 works as drag against gas outflow, so as to restrict the gas discharge rate from the slit-like vent hole 22 depending on the open degree of the vent hole 22. This makes the gas discharge rate during the inflation and expansion of the air bag body 12 approximately linear, thereby to provide advantage in moderating the gas discharge from the vent hole 22.

In this variation, the non-overlapped portion is exemplified to be the rectangular portion 42, but is not limited to this shape as far as the face 40a and the face 40b are made asymmetrical.

FIGS. 17 and 18 show another embodiment of the present invention, in which the air bag system 10a may be installed to a driver's seat. Note that the same numerical references are used for the same components, and detailed descriptions will be omitted.

Figure 17A:
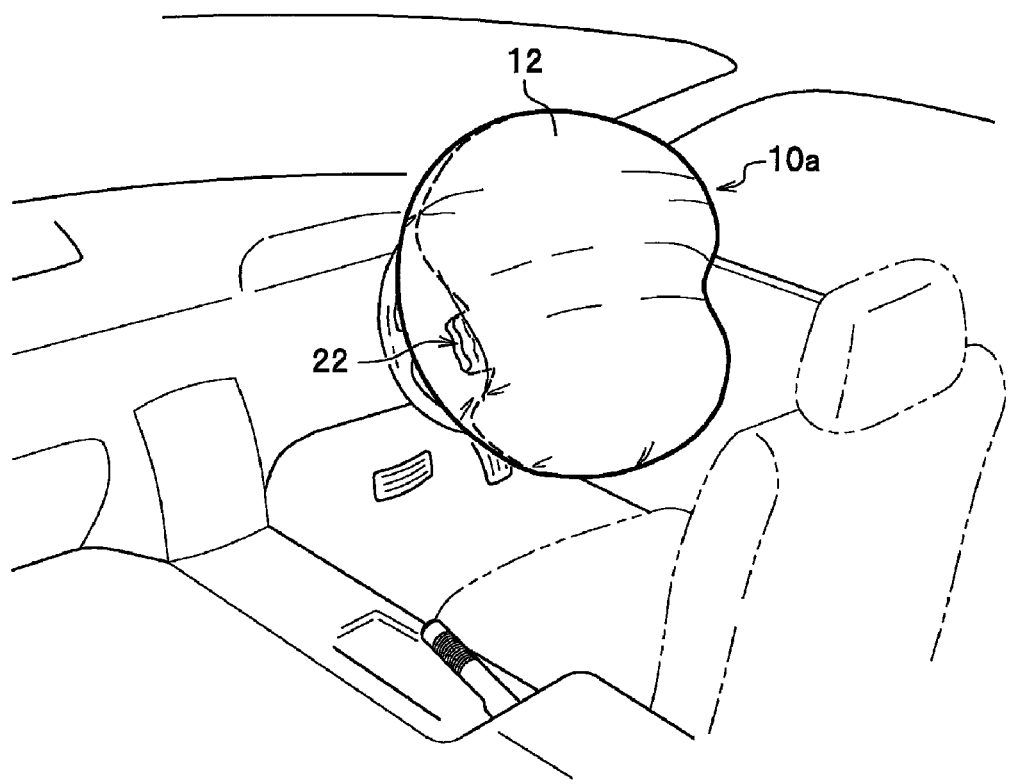
FIG. 17A is a schematic perspective view showing a state in which the air bag system for a vehicle is applied to a driver's seat, and the air bag body is inflated and expanded, according to another embodiment of the present invention.
Figure 17B:
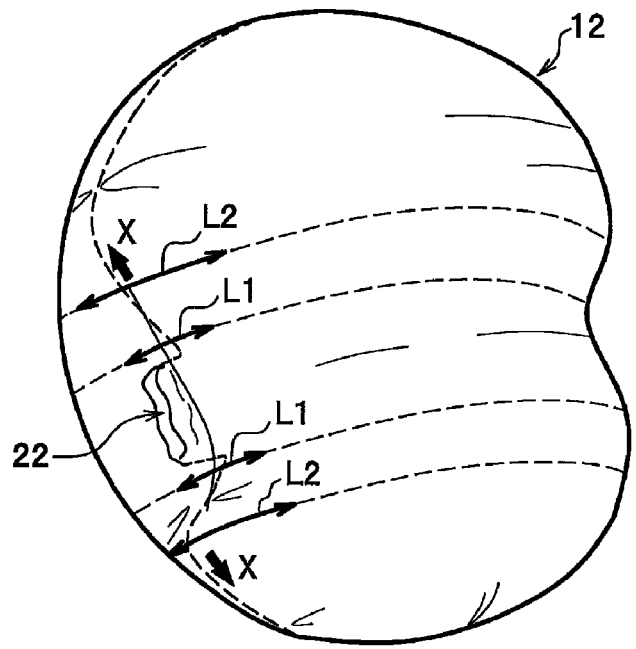
FIG. 17B is an enlarged perspective view showing a state in which the air bag body is inflated and expanded.
Figure 18A:
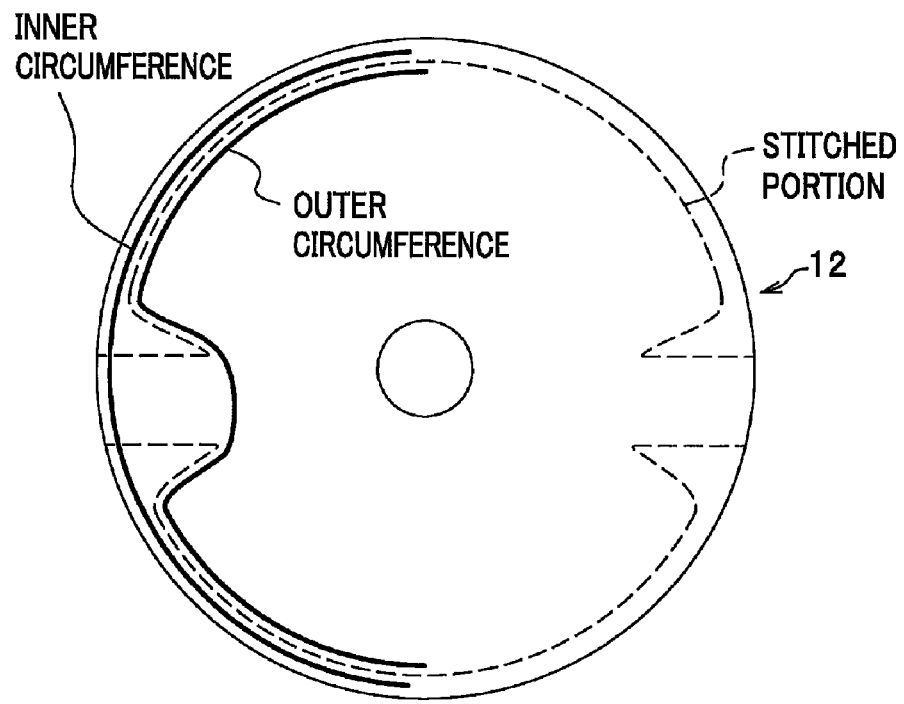
FIG. 18A is a plan view showing how the plural base fabric material of the air bag body of FIG. 17A is stitched.
Figure 18B:
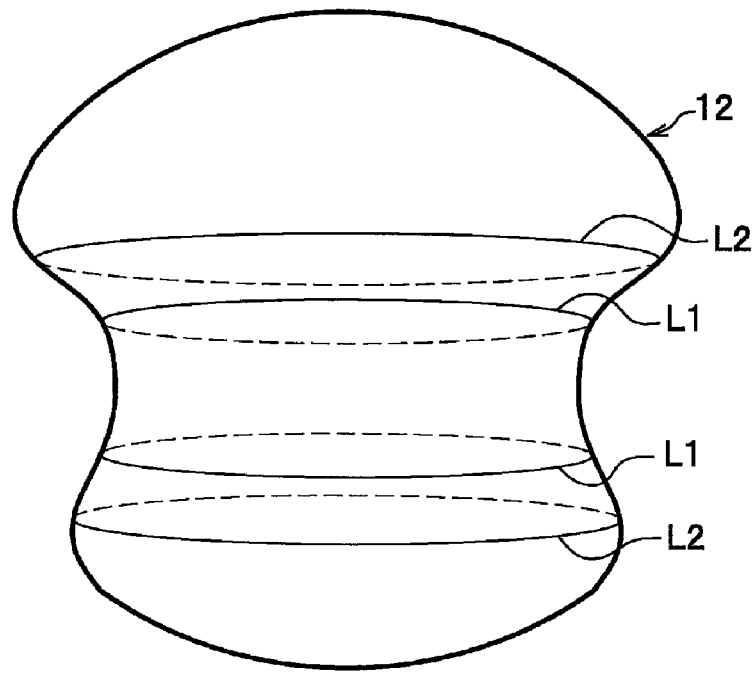
FIG. 18B is a plan view showing a state in which the stitched air bag body is turned over with the front side out.

FIG. 17A is a schematic perspective view showing a state in which the air bag body 12 is inflated and expanded at a driver's seat, FIG. 17B is an enlarged perspective view of the air bag body 12 inflated and expanded. FIG. 18A is a plan view showing a state in which the plural base fabric pieces are stitched, and also showing a positional relation between the outer circumference and the inner circumference of the air bag body 12 when inflated and expanded, and FIG. 18B is a plan view showing a state in which the stitched air bag body 12 is turned over with the front side out.

As shown in FIGS. 17A to 18B, in its inflation and expansion state, the air bag body 12 is formed such that the circumferential length L1 passing through the longitudinal end of the vent hole 22 is locally reduced so as to be shorter than the circumferential length L2 extending outer side from the bend hole 22 in the longitudinal direction (L1<L2). As mentioned above, the air bag system 10a may be applied to the driver's seat, thereby to enhance general purpose property, and realize reduction of size and weight.

Other structures, component and or operational effects are the same as those of the above embodiment, thus the detailed descriptions will be omitted.

As mentioned above in details, the present invention provides an air bag system for a vehicle including an air bag body constituted by stitching plural base fabric pieces; an inflator that supplies gas into the air bag body; a vent hole which is a through hole provided in the air bag body so as to communicate the inside with the outside of the air bag body. In this air bag system for a vehicle, the vent hole is formed to be long in one direction, and there are provided a tensile-force applying means that applies tensile-force along the longitudinal direction of the vent hole, and a pair of faces along the gas injection port of the vent hole, and this pair of the faces function as a flow-passage restriction membrane.

Therefore, according to the present invention, in a normal inflation/expansion state in which there is no obstacle in the inflation and expansion direction of the air bag body, the tensile-force applying means applies a predetermined tensile-force onto the pair of the faces, so that the faces function as the flow-passage restriction membrane and cause a sealing effect, thereby to reduce gas leakage from the vent hole. Accordingly, it is possible to inflate and expand the air bag body with the vent hole closed, as well as maintaining gas pressure in the air bag body at a constant rate.

On the other hand, if there is an obstacle in the expanding direction of the air bag body, and when the air bag body comes in contact with and presses this obstacle, smaller tensile-force is applied by the tensile-force applying means, compared to the tensile-force in the normal inflation/expansion state, so that the pair of the faces working as the flow-passage restriction membrane get apart from each other to form a wide opening, through which the gas is discharged. Accordingly, if the air bag body comes in contact with and presses an obstacle or the like during its inflation and expansion, the gas filling the air bag body is allowed to flow out through the vent hole to the outside, so as to reduce load (energy) applied onto the obstacle, thereby to properly prevent excessive energy from being applied onto the obstacle or the like.

In the present invention, the air bag body is constituted by plural basic fabric pieces, the air bag body further includes a stitched section where at least two pieces of the plural basic fabric pieces are stitched. The vent hole is provided in the stitched section, and the stitched section includes a neck portion that is set in the direction from the outside toward the inside of the air bag body so that, when the air bag body is inflated and expanded, an outer circumferential length passing through a longitudinal end of the vent hole of the air bag body is locally reduced so as to be shorter than an outer circumferential length extending outer side from the vent hole.

Furthermore, in the present invention, the air bag body is constituted by plural basic fabric pieces, and includes a stitched section where at least two pieces of the plural basic fabric pieces are stitched, and the vent hole is provided in the stitched section. The stitched section includes a bend section recessed in curve toward the inside of the air bag body, so that, when the air bag body is inflated and expanded, an outer circumferential length passing through a longitudinal end of the vent hole of the air bag body (L1) is locally reduced so as to be shorter than an outer circumferential length extending outer side from the vent hole (L2); and an end-support that supports both the contactedly overlapped side ends of the faces, and the bend section includes the tensile-force applying means.

According to the present invention, surface pressure distribution of the inner wall of the air bag body, pushed by the filling gas, may be found through an experiment or simulation in advance, and based on results of the experiment or simulation, the tensile-force applying means may be provided so as to apply tensile-force onto the pair of the faces in the longitudinal direction apart from the vent hole.

The tensile-force applying means may be a neck portion that is set in the direction from the outside toward the inside of the air bag body, constituted such that, when the air bag body is inflated and expanded, the circumferential length (L1) passing through the longitudinal end of the vent hole 22 is locally reduced so as to be shorter than the circumferential length (L2) extending outer side from the bend hole 22 in the longitudinal direction. With this neck portion, predetermined tensile-force that pulls the pair of the faces in the longitudinal direction apart from the vent hole is generated, so that the vent hole is sealed. When the air bag body comes in contact with and presses an obstacle during its inflation and expansion, the membrane stress applied in the direction to seal the pair of the faces is reduced so that the vent hole is opened, and gas is discharged through this opened vent hole, thereby to reduce energy (collision energy) applied onto the obstacle.

An alternative tensile-force applying means, for example, may be a bend section formed by stitching in a curve line the contactedly overlapped side ends of the pair of the faces, constituted such that, when the air bag body is inflated and expanded, the circumferential length (L1) passing through the longitudinal end of the vent hole 22 is locally reduced so as to be shorter than the circumferential length (L2) extending outer side from the bend hole 22 in the longitudinal direction. This bend section causes predetermined tensile-force that pulls the pair of the faces in the direction apart from the vent hole, so that the vent hole is sealed. When the air bag body comes in contact with and presses an obstacle during its inflation and expansion, the membrane stress applying in the direction to seal the pair of the faces is varied so that the vent hole is opened, and gas is discharged through this opened vent hole, thereby to reduce energy (collision energy) applied onto the obstacle.

Yet, another alternative tensile-force applying means, for example, may be at least one strap member fixed in the vicinity of at least either of the longitudinal ends of the vent hole so as to reduce the circumferential length of the air bag body passing through the longitudinal end. The strap member facilitates in applying the predetermined tensile-force onto the vent hole.

The air bag body may be constituted by plural base fabric pieces, and the vent hole may be provided on the non-stitched portion defined by the stitched portion formed by stitching at least two pieces of the plural base fabric pieces stitched together, which facilitates and enables mass-production of the air bag body. Moreover, the end-support functions for supporting both the contactedly overlapped side ends of the pair of the faces in the longitudinal direction, so as to securely bring the faces in contact with each other, there by to cause sealing effect.

At this time, the present invention may provide a pair of faces in an asymmetrical shape, which prevent burst outflow of gas from the vent hole so as to moderate the gas outflow.

In the present invention, the pair of the faces are provided inside of the air bag body, facing the inner space thereof, so that the gas surface pressure pushes the pair of the faces together, and combination of this surface pressure and the above tensile-force greatly enhances prevention of gas leakage from the vent hole.

Yet, the present invention provides a slit-like vent hole along the direction from the upper front side to the lower rear side of a vehicle, so that the air bag body may cover from a relatively larger substance at the upper front side to a relatively smaller substance at the lower rear side of the vehicle, thereby to prevent an excessive energy from being applied onto this substance.

The present invention further provides an air bag system for a vehicle including an air bag body formed in a bag form, an inflator that charges the air bag body with gas and a vent hole provided in the air bag body for discharging the gas filling the air bag body.

In the above air bag system, the air bag body includes a pair of faces that are provided around the vent hole to form the vent hole in a slit-like shape extending in one direction, and a tensile-force applying section that applies tensile-force onto the pair of the faces in the longitudinal direction apart from the vent hole. The pair of the faces becomes closed and sealed when the tensile-force applying section applies a predetermined tensile-force onto the pair of the faces, and the pair of the faces becomes apart from each other and opened when the tensile-force applying section applies smaller tensile-force than the predetermined tensile-force onto the pair of the faces, so that the gas filling the air bag body is discharged from the opening of the pair of the faces.

According to the present invention, in the normal inflation/expansion state in which there is no obstacle in the expansion direction of the air bag body, the tensile-force applying section applies the predetermined tensile-force onto the pair of the faces so as to be almost completely sealed, thereby reduce gas leakage from the vent hole. Therefore, it is possible to inflate and expand the air bag body with the vent hole almost completely sealed while maintaining the gas pressure in the air bag body at a constant rate.

On the other hand, if there is an obstacle in the expansion direction of the air bag body and the air bag body comes in contact with and presses the obstacle during its inflation and expansion, the tensile-force applying section applies smaller tensile-force, compared to that in the normal inflation/expansion state, so that the pair of the faces get apart from each other to form a wide opening, through which the filling gas is discharged. Accordingly, since the gas filling the air bag body is allowed to be discharged outside through the vent hole when the air bag body comes in contact with and presses an obstacle or the like during its inflation and expansion, it is possible to reduce load (energy) applied onto the obstacle, thereby to prevent excessive energy from being applied onto the obstacle.

The present invention yet further provides an air bag system for a vehicle including an air bag formed by stitching basic fabric material, an inflator that charges the air bag body with gas, and a vent hole that is a through hole provided in the air bag body so as to communicate the inside with the outside of the air bag body. In the above air bag system, the vent hole for discharging the gas filling the air bag body is formed in a long slit along the direction to restrict the expansion of the air bag.

According to the present invention, if there is an obstacle or the like in the direction where the air bag body is expanded, that is, the direction where the expansion of the air bag body should be restricted, and the obstacle comes in contact with and pressed by the air bag body, the long slit becomes opened, and gas is discharged from this opened slit, so that excessive energy can preferably be prevented from being applied onto the obstacle or the like.

The present invention provides an air bag system for a vehicle, that can regulate discharge rate of the gas filling the air bag body from the vent hole thereof when the air bag body comes in contact with and presses an obstacle or the like during its inflation and expansion, and also can inflate and expand the air bag body quickly with the vent hole closed when the body does not come in contact with the obstacle, while maintaining the gas pressure in the air bag body at a constant rate.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An air bag system for a vehicle comprising an air bag body formed by stitching base fabric material, an inflator that charges the air bag body with gas, and a vent hole that is a through hole provided in the air bag body so as to communicate the inside with the outside of the air bag body, wherein
the vent hole of the air bag body is formed to be slit-like and longer in a longitudinal direction thereof, and
the air bag body comprises:
two base fabric pieces joined together at a joining seam that is spaced apart from outer perimeter edges of the base fabric pieces such that overlapping side ends are disposed between the outer perimeter edges and the joining seam; and
a tensile-force applying mechanism that applies tensile-force in the longitudinal direction of the vent hole, including a pair of V-shaped stitched lines formed on the side ends of the two base fabric pieces with a predetermined distance therebetween such that the V-shaped stitched lines define the vent hole as an unstitched slit formed by a discontinuity in the joining seam;
wherein the side ends of the base fabric pieces are disposed in the interior of the airbag body;
wherein at least one segment of each of the V-shaped stitched lines extends into the airbag body; and
wherein portions of the side ends disposed between the pair of V-shaped stitched lines define a pair of faces and form a flow-passage restriction membrane.

2. The air bag system for a vehicle according to the claim 1, wherein
the pair of V-shaped stitch lines jointly form a neck portion in the flow-passage restriction membrane that is set in a direction from the outside toward the inside of the air bag body, so that, when the air bag body is inflated and expanded, an outer circumferential length of the air bag body passing through a longitudinal end of the vent hole is locally reduced so as to be shorter than an outer circumferential length of the air bag body measured a short distance from the vent hole.

3. The air bag system for a vehicle according to the claim 2, wherein the pair of faces of the side ends that form the flow-passage restriction membrane are formed in an asymmetrical shape.

4. The air bag system for a vehicle according to the claim 2, wherein the flow-passage restriction membrane is provided with an air entry end thereof inside the air bag body with respect to the outer edge of the airbag body as defined by the joining seam and an air exit end thereof aligned with the outer edge of the air bag body.

5. The air bag system for a vehicle according to the claim 2, wherein the longitudinal direction of the vent hole extends from the upper front side to the lower rear side of the vehicle.

6. The air bag system for a vehicle according to the claim 1, wherein the pair of faces of the side ends that form the flow-passage restriction membrane are formed in an asymmetrical shape.

7. The air bag system for a vehicle according to the claim 1, wherein the flow-passage restriction membrane is provided with an air entry end thereof inside the air bag body and an air exit end thereof aligned with the outer edge of the air bag body.

8. The air bag system for a vehicle according to the claim 1, wherein the longitudinal direction of the vent hole extends from the upper front side to the lower rear side of the vehicle.

9. The air bag system for a vehicle according to the claim 1, wherein the tensile-force applying mechanism further includes an extension portion to each of the V-shaped stitch lines extending approximately parallel to an edge line of the side ends, and wherein each said V-shaped stitch line includes a first portion inclining from a terminal point of the extension portion toward the outer side of the airbag body when the side ends are inside the airbag body, and a second portion sharply bent from a terminal point of the first portion toward a side of the side ends.

10. An air bag system for a vehicle comprising:
an air bag body formed in a bag form, an inflator that charges the air bag body with gas and a vent hole provided in the air bag body so as to discharge the gas filling the air bag body, wherein
the air bag body comprises:
two base fabric pieces joined together at a joining seam that is spaced apart from outer perimeter edges of the base fabric pieces such that overlapping side ends are disposed between the outer perimeter edges and the joining seam; and
a tensile-force applying section that applies tensile-force in the longitudinal direction apart from the vent hole, including a pair of V-shaped stitched lines formed on the side ends of the two base fabric pieces with a predetermined distance therebetween such that the V-shaped stitched lines define the vent hole as an unstitched slit formed by a discontinuity in the joining seam;

wherein the side ends of the base fabric pieces are disposed in the interior of the airbag body;

wherein at least one segment of each of the V-shaped stitched lines extends into the airbag body; and wherein portions of the side ends disposed between the pair of V-shaped stitched lines define a pair of faces, the pair of the faces becomes closed and sealed when the tensile-force applying section applies predetermined tensile-force onto the pair of the faces, and the pair of the faces become apart from each other and opened when the tensile-force applying section applies smaller tensile-force than the predetermined tensile-force onto the pair of the faces, so that the gas filling the air bag body is discharged from the opening of the pair of the faces.

11. The air bag system for a vehicle according to the claim 10, wherein the tensile-force applying mechanism further includes an extension portion to each of the V-shaped stitch lines extending approximately parallel to an edge line of the side ends, and wherein each said V-shaped stitch line includes a first portion inclining from a terminal point of the extension portion toward the outer side of the airbag body when the side ends are inside the airbag body, and a second portion sharply bent from a terminal point of the first portion toward a side of the side ends.

12. The air bag system for a vehicle according to the claim 10, wherein the tensile-force applying section normally applies the predetermined tensile-force onto the pair of the faces when the airbag body is being charged with gas by the inflator, but applies the smaller tensile-force than the predetermined tensile-force onto the pair of the faces when the airbag body engages against an obstacle while being charged with gas by the inflator.

13. An air bag system for a vehicle comprising:
an air bag formed by stitching base fabric material,
an inflator that charges the air bag body with gas, and
a vent hole that is a through hole provided in the air bag body so as to communicate the inside with the outside of the air bag body, wherein the vent hole for discharging the gas filling the air bag body is formed to be a long slit extending longitudinally along a direction to restrict the expansion of the air bag, and the air bag body comprises:
two base fabric pieces joined together at a joining seam that is spaced apart from outer perimeter edges of the base fabric pieces such that overlapping side ends are disposed between the outer perimeter edges and the joining seam; and a tensile-force applying mechanism that applies tensile-force in the longitudinal direction of the vent hole, including a pair of V-shaped stitched lines formed on the side ends of the two base fabric pieces with a predetermined distance therebetween such that the V-shaped stitched lines define the vent hole as an unstitched slit formed by a discontinuity in the joining seam;

wherein the side ends of the base fabric pieces are disposed in the interior of the airbag body;

wherein at least one segment of each of the V-shaped stitched lines extends into the airbag body; and wherein portions of the side ends disposed between the pair of V-shaped stitched lines define a pair of faces and form a flow-passage restriction membrane having an air entry end and an air exit end.

14. The air bag system for a vehicle according to the claim 13, wherein the tensile-force applying mechanism further includes an extension portion to each of the V-shaped stitch lines extending approximately parallel to an edge line of the side ends, and wherein each said V-shaped stitch line includes a first portion inclining from a terminal point of the extension portion toward the outer side of the airbag body when the side ends are inside the airbag body, and a second portion sharply bent from a terminal point of the first portion toward a side of the side ends.

15. The air bag system for a vehicle according to the claim 13, wherein the air exit end of the flow-passage restriction membrane is aligned with the outer edge of the air bag body and the air entry end of the flow-passage restriction membrane is disposed inside the air bag body.

* * * * *